(12) United States Patent
Yasuda et al.

(10) Patent No.: US 9,823,815 B2
(45) Date of Patent: Nov. 21, 2017

(54) INFORMATION PROCESSING APPARATUS AND INFORMATION PROCESSING METHOD

(71) Applicant: SONY CORPORATION, Tokyo (JP)

(72) Inventors: Ryouhei Yasuda, Kanagawa (JP); Takuro Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 14/601,485

(22) Filed: Jan. 21, 2015

(65) Prior Publication Data

US 2015/0253939 A1    Sep. 10, 2015

(30) Foreign Application Priority Data

Mar. 7, 2014    (JP) ................................ 2014-045057

(51) Int. Cl.
| | |
|---|---|
| G06F 3/048 | (2013.01) |
| G06F 3/0482 | (2013.01) |
| G06F 3/01 | (2006.01) |
| G06F 3/0484 | (2013.01) |
| G06F 3/03 | (2006.01) |
| G06F 3/0481 | (2013.01) |
| B60K 35/00 | (2006.01) |
| B60K 37/06 | (2006.01) |

(52) U.S. Cl.
CPC ............ *G06F 3/0482* (2013.01); *B60K 35/00* (2013.01); *B60K 37/06* (2013.01); *G06F 3/013* (2013.01); *G06F 3/017* (2013.01); *G06F 3/0304* (2013.01); *G06F 3/04812* (2013.01); *G06F 3/04842* (2013.01)

(58) Field of Classification Search
CPC ......... G06F 3/013; G06F 3/012; B60K 37/00; G01C 21/36
See application file for complete search history.

(56) References Cited

U.S. PATENT DOCUMENTS

| | | | | |
|---|---|---|---|---|
| 5,305,435 A | * | 4/1994 | Bronson ............... | G06F 3/0481 715/775 |
| 6,204,828 B1 | * | 3/2001 | Amir ...................... | G06F 3/013 345/156 |
| 6,545,700 B1 | * | 4/2003 | Monroe ................. | H04M 3/567 348/14.07 |
| 8,120,577 B2 | * | 2/2012 | Bouvin ................... | G06F 3/013 345/157 |
| 2005/0001838 A1 | * | 1/2005 | Gregorio ............... | G06F 3/0485 345/440 |

(Continued)

FOREIGN PATENT DOCUMENTS

JP    2001-075712    3/2001

*Primary Examiner* — Ryan Pitaro
(74) *Attorney, Agent, or Firm* — Paratus Law Group, PLLC

(57) ABSTRACT

There is provided an information processing apparatus including a line-of-sight position acquisition unit configured to acquire a line-of-sight position of a user, a state control unit configured to perform a transition to an active state in response to a first operation performed by the user, the active state being capable of selecting an object by the user through a line of sight of the user, and a processing unit configured to determine an object corresponding to the acquired line-of-sight position as a selected object in response to a second operation performed by the user subsequent to the first operation.

19 Claims, 10 Drawing Sheets

(56) References Cited

U.S. PATENT DOCUMENTS

| | | | |
|---|---|---|---|
| 2005/0243054 A1* | 11/2005 | Beymer | A61B 3/0033 345/156 |
| 2008/0016156 A1* | 1/2008 | Miceli | G06Q 10/10 709/204 |
| 2012/0169582 A1* | 7/2012 | Tschirhart | G02B 27/01 345/156 |
| 2012/0249591 A1* | 10/2012 | Maciocci | G06F 3/011 345/633 |
| 2013/0054622 A1* | 2/2013 | Karmarkar | G06F 17/30032 707/749 |
| 2013/0300636 A1* | 11/2013 | Cunningham | G10L 13/02 345/8 |
| 2014/0171959 A1* | 6/2014 | Yacono | A61F 9/00745 606/128 |
| 2014/0208145 A1* | 7/2014 | Piccolotto | G06F 1/32 713/324 |
| 2015/0058649 A1* | 2/2015 | Song | G06F 1/3231 713/323 |
| 2015/0084864 A1* | 3/2015 | Geiss | G06F 3/013 345/158 |
| 2015/0145777 A1* | 5/2015 | He | G06K 9/0061 345/158 |
| 2015/0268821 A1* | 9/2015 | Ramsby | G06F 3/013 715/765 |
| 2016/0179189 A1* | 6/2016 | Shibata | B60K 35/00 345/156 |

* cited by examiner

FIG. 1
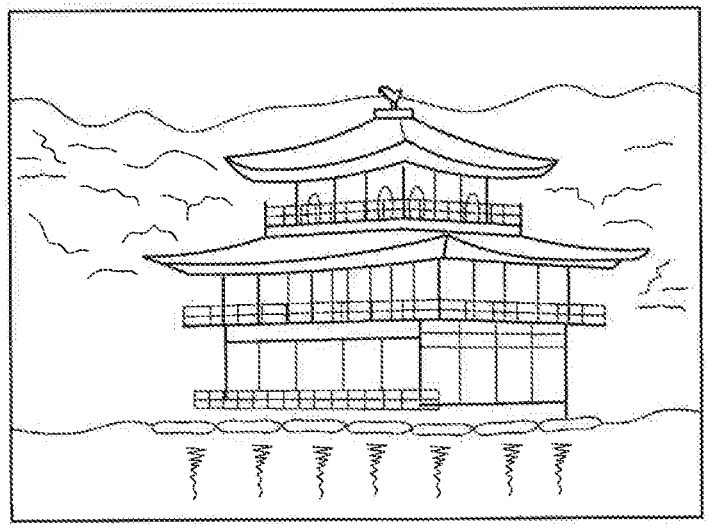
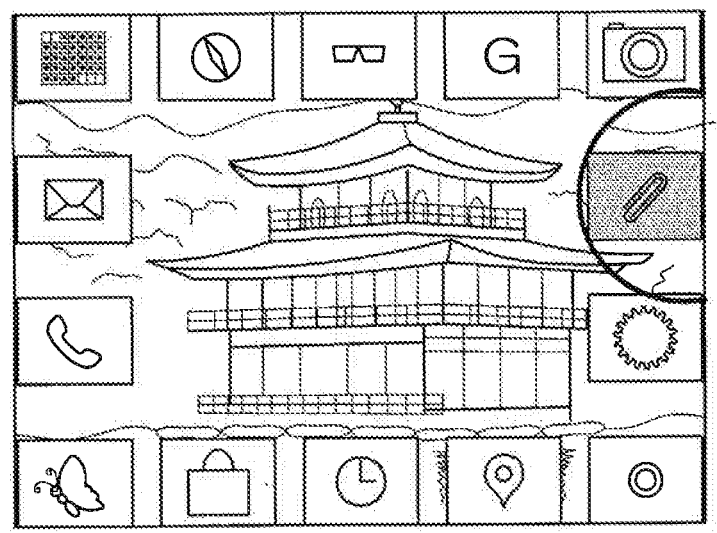

FIG. 3
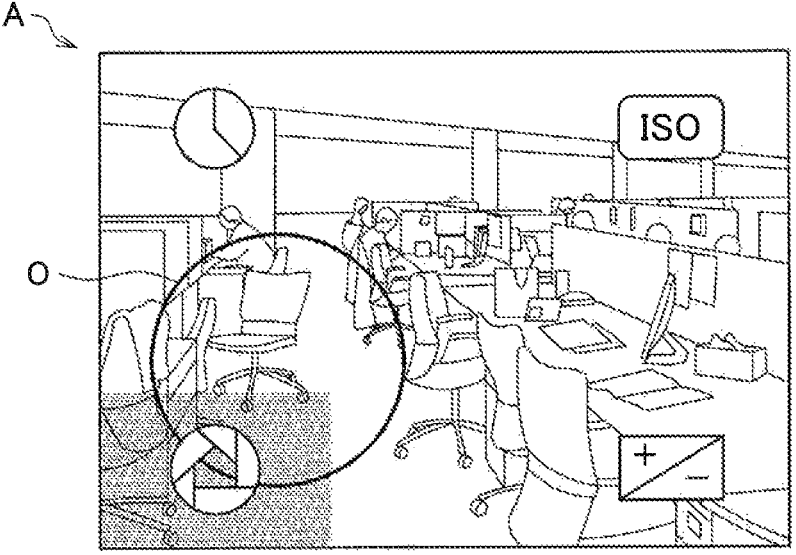
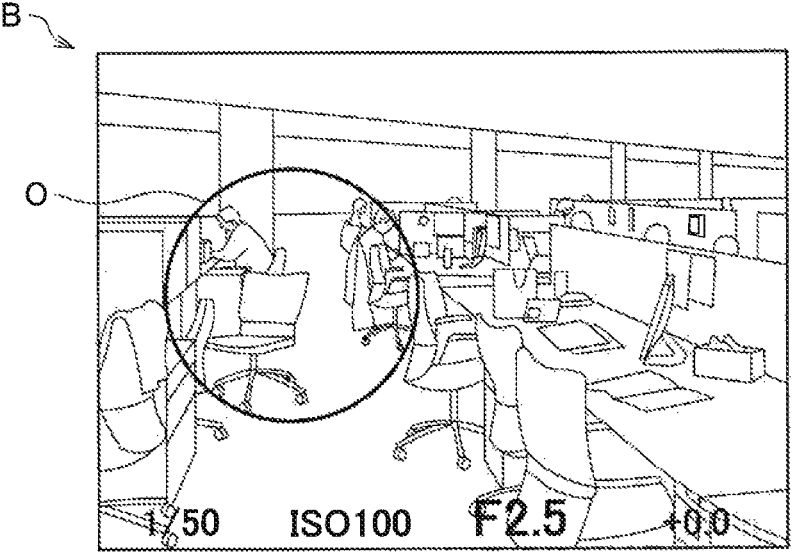

FIG. 10

| | IMAGING DEVICE | OPERATION DEVICE | TARGET OF SELECTION AND OPERATION |
|---|---|---|---|
| CAMERA | CAMERA BUILT IN ELECTRONIC VIEW FINDER | BUTTON, DIAL WITH PUSH FUNCTION | SHOOTING MODE (SETTING OF AUTO, MANUAL, FLASH, ETC.), SHOOTING PARAMETER (ISO, APERTURE STOP, EXPOSURE COMPENSATION, ETC.) |
| GLASSES | CAMERA BUILT IN GLASSES FRAME | BUTTON, PROXIMITY SENSOR, FOOT SWITCH | APPLICATION ACTIVATION, CONTENT OPERATION (PLAY, STOP, ETC.), SWITCHING OF SETTING, SELECTION OF OPERATION TOOL (INTRUMENTS SUCH AS SURGICAL KNIFE, FORCEPS IN MEDICAL FIELD) |
| AUTOMOBILE | CAMERA MOUNTED NEAR WINDSHIELD | BUTTON, DIAL ON STEERING WHEEL OR CENTER CONSOLE | AUDIO OPERATION (PLAY/STOP, VOLUME, MUSIC SELECTION, RADIO TUNING), AIR CONDITIONING OPERATION (TEMPERATURE, AIR VOLUME), DRIVING MODE (ECO/SPORTS/MANUAL, ETC.) |
| GAME | CAMERA MOUNTED NEAR DISPLAY SCREEN OR BUILT IN DISPLAY EQUIPMENT BODY | CONTROLLER, BUTTON ON KEYBOARD, TOUCH PANEL | SELECTION OF ITEM, CHANGE OF PARAMETER |

INFORMATION PROCESSING APPARATUS AND INFORMATION PROCESSING METHOD

CROSS REFERENCE TO RELATED APPLICATIONS

This application claims the benefit of Japanese Priority Patent Application JP 2014-045057 filed Mar. 7, 2014, the entire contents of which are incorporated herein by reference.

BACKGROUND

The present disclosure relates to an information processing apparatus and an information processing method.

Technologies are developed that are capable of adjusting a plurality of menu items in a setting screen based on a rotary or pressing operation. Such technologies include, for example, the technique disclosed in JP 2001-075712A.

SUMMARY

Use of operation devices with the ability to perform a rotary operation or a pressing operation allows users to perform, for example, a desired operation including a selection of a menu item displayed on a display screen. However, on the other hand, it is desirable to improve the usability that makes it easier for users to operate.

In an embodiment of the present disclosure, there is provided a novel and improved information processing apparatus and information processing method, capable of improving the usability.

According to an embodiment of the present disclosure, there is provided an information processing apparatus including a line-of-sight position acquisition unit configured to acquire a line-of-sight position of a user, a state control unit configured to perform a transition to an active state in response to a first operation performed by the user, the active state being capable of selecting an object by the user through a line of sight of the user, and a processing unit configured to determine an object corresponding to the acquired line-of-sight position as a selected object in response to a second operation performed by the user subsequent to the first operation.

According to another embodiment of the present disclosure, there is provided an information processing method for causing an information processing apparatus to execute acquiring a line-of-sight position of a user, performing a transition to an active state in response to a first operation performed by the user, the active state being capable of selecting an object by the user through a line of sight of the user, and determining an object corresponding to the acquired line-of-sight position as a selected object in response to a second operation performed by a user subsequent to the first operation.

According to one or more embodiments of the present disclosure, it is possible to achieve an improvement in the usability.

Note that the effects described above are not necessarily limited, and along with or instead of the effects, any effect that is described herein or other effects that can be expected from the present specification may be exhibited.

BRIEF DESCRIPTION OF THE DRAWINGS

FIG. 1 is an explanatory diagram of an example of an operation performed by an information processing method according to an embodiment of the present disclosure;

FIG. 3 is an explanatory diagram of an example of an operation performed by an information processing method according to an embodiment of the present disclosure;

FIG. 10 is an explanatory diagram illustrating examples of an operation device according to an embodiment of the present disclosure, an imaging device for a line-of-sight position acquisition process, and a target to be selected and operated by the user.

DETAILED DESCRIPTION OF THE EMBODIMENT(S)

Figure 2:
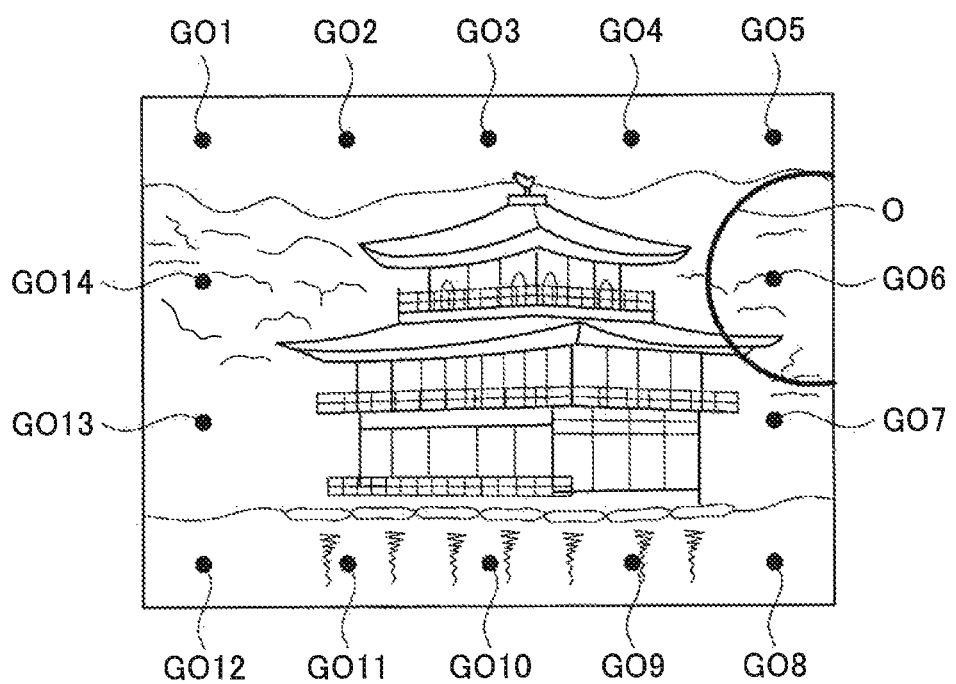
FIG. 2 is an explanatory diagram of an example of an operation performed by an information processing method according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the order described below:

1. Information processing method according to embodiment
2. Information processing apparatus according to embodiment
3. Program according to embodiment (Information processing method according to embodiment)

Before describing the configuration of an information processing apparatus according to an embodiment of the present disclosure, an information processing method according to an embodiment of the present disclosure will first be described. The information processing method according to an embodiment of the present disclosure will be described by taking as an example a case in which processing of the information processing method according to an embodiment of the present disclosure is performed by an information processing apparatus according to an embodiment of the present disclosure.

Overview of processing of information processing method according to embodiment of present disclosure As described above, use of operation devices with the ability to perform a rotary operation or a pressing operation allows a user to perform a desired operation. Use of an operation device such as buttons, operation keys, rotary-type selectors allows a user to perform reliably various operations including an operation for selecting an object (hereinafter, referred to as "selection operation") and an operation for determining a selection of an object (hereinafter, referred to as "selection determination operation").

An object according to an embodiment of the present disclosure may be selected by a user and is displayed on a display screen. The object includes an icon that is associated with application software or parameters in a setting screen and a virtual button that is displayed on a display screen. The object according to an embodiment of the present disclosure constructs, for example, menu item. The description will be mainly given on the assumption that the object according to an embodiment of the present disclosure is an icon.

When an object is selected using an operation device, for example, if a selection operation on an operation device is repeated a plurality of times, it may take time for selection of an object, for example, in a case of incapable of selecting a desired object. The users who are not familiar with manipulation of operation devices may necessitate more time for selection of an object.

In the information processing method according to an embodiment of the present disclosure, the selection of an object and the determination of the selection of an object can be performed by combing an operation through the line of sight of the user and an operation on an operation device. This improves the usability, which makes the user's operation experience more comfortable.

The operation device according to an embodiment of the present disclosure includes, for example, devices as described in (a), (b), and (c) given below.

(a) Operation device with the ability to obtain a binary detection value: buttons, touch-sensitive device, lever switch, dial switch, foot switch, proximity sensor, and other like devices The operation device described in the above (a) may obtain, for example, a binary detection value including a detection value corresponding to a state that is being operated (first detection value) and a detection value corresponding to a state that is not operated (second detection value).

The detection value corresponding to a state of not being operated, for example, is a detection value when the user does not perform an operation such as when the user does not press a button. In an embodiment of the present disclosure, the detection value indicating a state of not being operated may be set to, for example, 0 (zero) or a value smaller than a predetermined threshold that is greater than 0 (zero) (or a value less than or equal to the predetermined threshold).

The detection value corresponding to a state that is being operated, for example, is a detection value when the user performs an operation such as when the user presses a button. In an embodiment of the present disclosure, the detection value indicating a state of being operated may be set to a value greater than or equal to a predetermined threshold that is greater than 0 (zero) (or a value greater than the predetermined threshold).

(b) Operation device with the ability to obtain a ternary or more detection value: for example, a two-step push-button switch (push-button switch having a mechanism similar to that of a shutter button of a still camera), a multi-step switch of three or more steps, and other like devices.

In the operation device described in the above (b), a ternary or more detection value including a detection value corresponding to a state of not being operated (second detection value), a detection value corresponding to a state of performing a selection start operation of an object (third detection value), and a detection value corresponding to a state of performing a selection determination operation of an object (fourth detection value) is obtained.

The detection value corresponding to a state of not being operated (second detection value) is a detection value when the user does not perform an operation, similarly to the operation device described in the above (a).

The detection value corresponding to a state of performing a selection start operation of an object (third detection value) is a detection value obtained when the user performs a selection start operation. for example, if an operation device described in the above (b) is a two-step push-button switch, in an embodiment of the present disclosure, the detection value indicating a state of performing a selection start operation may be set to a value greater than or equal to a first threshold that is greater than 0 (zero) (or a value greater than the first threshold) and a value smaller than a second threshold that is greater than the first threshold (or a value smaller than or equal to the second threshold). In an embodiment of the present disclosure, the detection value indicating a state of performing a selection start operation corresponds to a detection value obtained when a switch is pressed halfway.

The detection value corresponding to the state of performing the selection determination operation of an object (fourth detection value) is a detection value obtained when the user performs the selection determination operation. For example, if an operation device described in the above (b) is a two-step push-button switch, in an embodiment of the present disclosure, the detection value indicating the state of performing the selection start operation may be set to a value greater than or equal to the second threshold (or a value greater than the second threshold). In an embodiment of the present disclosure, the detection value indicating the state of performing the selection start operation corresponds to a detection value obtained when a switch is further pressed from the state in which the switch is pressed halfway.

(c) Rotary-type selector including a mechanism for obtaining a binary detection value (mechanism corresponding to the operation device described in the above (a)) and a mechanism for obtaining a detection value in response to a rotary operation: for example, jog dial corresponding to a push-button switch.

In the mechanism for obtaining a binary detection value of the rotary-type selector described in the above (c), similarly to the operation device described in the above (a), a binary detection value including the detection value corresponding to a state of being operated (first detection value) and the detection value corresponding to a state of not being operated (second detection value) is obtained.

In the mechanism for obtaining a detection value in response to a rotary operation of the rotary-type selector described in the above (c), a detection value in response to the rotary operation (fifth detection value) performed by the user is obtained. In an embodiment of the present disclosure, a detection value of the rotary-type selector in response to the rotary operation has a plus and minus sign and a value. The plus and minus sign indicates an increase or decrease in a parameter and, the value indicates an increase or decrease value used to increase or decrease the parameter. The plus or minus sign is based on the direction of the rotary operation. The increase or decrease value is set based on how far it is rotated.

In an embodiment of the present disclosure, the operation device includes, for example, the operation devices described in the above (a) to (c). In an embodiment of the present disclosure, the operation device is not limited to the operation devices described in the above (a) to (c).

For example, in an embodiment of the present disclosure, the operation device may be the rotary-type selector having a mechanism for obtaining a ternary or more detection value (mechanism corresponding to the operation device described in the above (b)) and a mechanism for obtaining a detection value in response to a rotary operation.

The information processing method according to an embodiment of the present disclosure is described in more detail. In the information processing method according to an embodiment of the present disclosure, for example, an object is selected through a line of sight, a selection determination operation is performed on an operation device, and then the selection of a selected object is determined.

When the information processing method according to an embodiment of the present disclosure is used, the user's line of sight is directed toward an object, and thus the user can select the object, thereby selecting the object in a short time.

As a method that performs the determination of selection of an object through only a line of sight, when a line-of-sight position is included in a region corresponding to an object on a display screen for a predetermined given period of time, a method of determining the object corresponding to the line-of-sight position as a selected object is considered. However, when the method that performs the determination of selection of an object through only a line of sight is employed, it takes time to perform the determination of selection for the predetermined period of time, and if the determination of selection of an object is performed through only a line of sight, an erroneous detection may occur.

In contrast, the information processing method according to an embodiment of the present disclosure performs a selection determination operation on an operation device and determines the selection of a selected object. The operation on the operation device allows the selection of a selected object to be determined, and thus the selection of an object can be determined in shorter period of time than the case of using the method in which the determination of selection of an object is performed through only a line of sight, and it is possible to determine an object in a more reliable way. Furthermore, when the selection of a selected object is determined using the selection determination operation on an operation device, the user's mental and/or physical burden is reduced, as compared to the case in which the selection of a selected object is determined by a particular utterance of speech or a particular gesture.

As an example, the information processing method according to an embodiment of the present disclosure allows the user to be in a state of selecting an object through the line of sight in response to a first operation performed by the user. In an embodiment of the present disclosure, the first operation is an operation in which the user starts the selection of an object using an operation device (hereinafter, referred to as "selection start operation"). Hereinafter, a state that allows the user to select an object through the user's line of sight is referred to as "active state", and a state that prevents the user from selecting an object through the user's line of sight is referred to as "inactive state".

In an embodiment of the present disclosure, the active state includes, for example, "state in which an object, which is not displayed on a display screen in the inactive state and is able to be selected through the line of sight, is displayed on a display screen", and "state in which an object, which is not displayed on a display screen in the inactive state and is unable to be selected through the line of sight, is able to be selected through the line of sight. In an embodiment of the present disclosure, the display screen includes, for example, a display screen of a display unit (described later) provided in the information processing apparatus according to an embodiment of the present disclosure and a display screen of an external display device of the information processing apparatus according to an embodiment of the present disclosure.

The transition to the active state by the selection start operation using an operation device allows the user to select an object through the line of sight as intended by the user by employing a more reliable operation using an operation device as a trigger. The transition to the active state by the selection start operation using an operation device can prevent an object unintended by the user, for example, in a "case in which the user turns the light of sight without intention of the selection of an object and then an object unintended by the user is selected in response to the movement of the line of sight" from being selected.

Thus, the information processing method according to an embodiment of the present disclosure can achieve an improvement in the usability.

Example of operation performed by information processing method according to embodiment of present disclosure An example of an operation performed by the information processing method according to an embodiment of the present disclosure is described. The following description is mainly given on the assumption that a button, which is used as the operation device according to an embodiment of the present disclosure, allows the user to obtain a binary detection value by performing a pressing operation.

FIGS. 1 to 5 are explanatory diagrams of an example of the operation performed by the information processing method according to an embodiment of the present disclosure.

(i) First example of operation performed by information processing method according to embodiment of present disclosure (FIGS. 1 and 2)

FIG. 1 illustrates an example of a screen displayed on a display screen of glasses-type devices eyewear), imaging devices such as a still camera and digital camera, or tablet-type devices. A of FIG. 1 illustrates an example of a display screen in an inactive state, and B of FIG. 1 illustrates an example of a display screen in an active state.

(i-1) Operation from Selection Start to Selection

For example, when the user performs a selection start operation (first operation) on a button (example of an operation device), the information processing apparatus according to an embodiment of the present disclosure is in the active state. Then, the display screen is changed from a state in which an icon shown in A of FIG. 1 (example of an object) is displayed to a state in which an icon shown in B of FIG. 1 is displayed.

In an embodiment of the present disclosure, the selection start operation (first operation) on a button (example of an operation device) includes, for example, operations described below.

Maintaining the state of a button being pressed (the operation device is changed from a state of not being operated to a state of being operated, and remains in a state of being operated)

Releasing the button after a button is pressed (the operation device is changed from a state of not being operated to a state of being operated, and then it is changed from a state of being operated to a state of not being operated)

In an embodiment of the present disclosure, as described above, the selection start operation is similarly applied to the mechanism for obtaining a binary detection value, in the operation device described in the above (a) such as touch-sensitive devices or the operation device described in the above (c).

In an embodiment of the present disclosure, if a two-step push-button switch is used, the selection start operation (first operation) on the operation device described in the above (b) includes, for example, an operation as described below.

Maintaining the state of a switch being pressed halfway (the operation device is changed from a state of not being operated to a state of being subjected to the selection start operation of an object, and then it remains a state of being subjected to the selection start operation of an object)

In the active state, the user selects an icon through the line of sight. In the example shown in B of FIG. 1, an example in which one icon from among a plurality of icons is selected through the line of sight is illustrated.

The information processing apparatus according to an embodiment of the present disclosure, for example as shown in B of FIG. 1, allows an auxiliary object O indicating a line-of-sight position to be displayed at a position of the display screen corresponding to the line-of-sight position obtained by the a line-of-sight position acquisition process described later. In the example shown in B of FIG. 1, the information processing apparatus according to an embodiment of the present disclosure allows a circular object having a given radius centered on the line-of-sight position to be displayed on the display screen as the auxiliary object O. Examples of the auxiliary object O are not limited to the example shown in B of FIG. 1. The information processing apparatus according to an embodiment of the present disclosure may prevent an auxiliary object O from being displayed on the display screen.

The processing performed by the information processing method according to an embodiment of the present disclosure, for example as shown in FIG. 1, allows the user to select an icon (example of an object) through the line of sight by performing the selection start operation on a button (example of an operation device) as a trigger.

In an embodiment of the present disclosure, the display screen in the inactive state is not limited to the example shown in A of FIG. 1.

For example, in the inactive state, the information processing apparatus according to an embodiment of the present disclosure may allow guidance objects GO1 to GO14 to be displayed at the positions of the display screen on which a plurality of objects are displayed in the active state, as shown in FIG. 2. The guidance objects GO1 to GO14 indicate that an object is likely to be displayed.

The display of the guidance objects GO1 to GO14 allows the user to direct the line of sight previously to a position at which an object associated with a desired process is displayed, before the selection start operation is performed on an operation device. Thus, the display of the guidance objects GO1 to GO14 allows the user to select an object in a short time.

The information processing apparatus according to an embodiment of the present disclosure may allow the auxiliary object O to be displayed even in the inactive state, similarly to B of FIG. 1. Meanwhile, when the guidance objects GO1 to GO14 are displayed as shown in FIG. 2, the information processing apparatus according to an embodiment of the present disclosure may prevent the auxiliary object O from being displayed.

(i-2) Determination of Selection

In an embodiment of the present disclosure, when the user performs a second operation on a button (example of an operation device), the information processing apparatus determines an object corresponding to the line-of-sight position as a selected object. In an embodiment of the present disclosure, the information processing apparatus determines an object at which the line-of-sight position is located in a region associated with the object as the selected object. In an embodiment of the present disclosure, the region associated with an object may be the same region as the object, or may be a region greater in size than the object.

In an embodiment of the present disclosure, the second operation may be a selection determination operation. In an embodiment of the present disclosure, the selection determination operation (second operation) on a button (example of an operation device) includes, for example, operations describe below.

Releasing a button being pressed (the operation device is changed from a state of being operated to a state of not being operated)

Releasing a button after the button is pressed (the operation device is changed from a state of not being operated to a state of being operated and then is changed from a state of being operated to a state of not being operated)

In an embodiment of the present disclosure, as described above, the selection determination operation is similarly applied to the mechanism for obtaining a binary detection value, in the operation device described in the above (a) such as touch-sensitive devices or the operation device described in the above (c).

In an embodiment of the present disclosure, if a two-step push-button switch is used, the selection determination operation (second operation) on the operation device described in the above (b) includes, for example, an operation as described below.

Further pressing a switch in a state of being pressed halfway (the operation device is changed from a state of being subjected to the selection start operation of an object to a state of being subjected to the selection determination operation of the object)

The determination of an object corresponding to the line-of-sight position as a selected object allows a process associated with the determined object to be performed. The process associated with the determined object may be performed by the information processing apparatus according to an embodiment of the present disclosure, or may be performed by an external device.

The processing performed by the information processing method according to an embodiment of the present disclosure allows the user to determine the selection of an icon (example of an object) selected through the line of sight by performing the selection determination operation on a button (example of an operation device).

(i-3) Cancellation of Selection

As described in the above (i-2), when the selection determination operation (second operation) is performed on a button (example of an operation device), the information processing apparatus according to an embodiment of the present disclosure determines an object corresponding to the line-of-sight position as a selected object.

When there is no object corresponding to the line-of-sight position, the information processing apparatus according to an embodiment of the present disclosure prevents the selected object from being determined. When the selected object is not determined, for example, the information processing apparatus according to an embodiment of the present disclosure performs a transition from the active state to the inactive state.

When the object determined as the selected object is the object associated with a process for terminating a process relating to the selection of an object, the information processing apparatus according to an embodiment of the present disclosure may perform a transition from the active state to the inactive state.

The information processing apparatus according to an embodiment of the present disclosure performs the process as described above and thus cancellation of the selection of an object can be performed.

In an embodiment of the present disclosure, a method of cancelling the selection of an object is not limited to that described above.

For example, the information processing apparatus according to an embodiment of the present disclosure can cancel the selection of an object based on the user's operation to cancel the selection of an object (hereinafter, referred to as "cancellation operation") on an operation device.

In an embodiment of the present disclosure, if a two-step push-button switch (example of the operation device shown in the above (b) is used), the cancellation operation includes, for example, an operation described below.

Releasing a switch in a state of being pressed halfway (the operation device is changed from a state of being subjected to the selection determination operation of an object to a state of not being subjected to the selection start operation of an object)

When a detection value of the operation device in response to the cancellation operation is detected, the information processing apparatus according to an embodiment of the present disclosure performs a transition from the active state to the inactive state.

(ii) Second example of operation performed by information processing method according to embodiment of present disclosure (FIG. 3)

As a second example of an operation performed by the information processing method according to an embodiment of the present disclosure, an example of an operation of performing the adjustment of a parameter relating to the object in which selection thereof is determined will be described.

FIG. 3 illustrates an example of a screen displayed on a display screen of an imaging device such as digital still cameras, digital video cameras, and smart phones with an imaging function. In a display screen displayed on glasses-type devices (eyewear), imaging devices, and tablet-type devices, as shown in FIG. 1 or in a display screen shown in FIGS. 4 and 5 described later, the similar operation may be performed.

(ii-1) Operation from Selection Start to Selection, Determination of Selection, and Cancellation of Selection The operations from selection start to selection, the operation of selection determination, and the operation of selection cancellation are similar to the first example of the operation performed by the information processing method according to an embodiment of the present disclosure described in the above (i).

(ii-2) Parameter Adjustment

If a selection of an icon (example of an object) corresponding to the aperture stop function is determined by performing the selection determination operation (second operation) when the display screen shown in A of FIG. 3 is displayed, for example as shown in B of FIG. 3, a selected and determined parameter ("F2.5" shown in B of FIG. 3) relating to the aperture stop function allows the screen is shifted to an adjustable display screen.

In B of FIG. 3, parameters ("1/50", "ISO100", "+0.0"), which corresponds to icons other than the icon corresponding to the aperture stop function shown in A of FIG. 3, are displayed, but these parameters corresponding to other icons may not be displayed. As shown in B of FIG. 3, parameters corresponding to other icons are displayed, and thus there are advantages that the selected and determined parameter relating to the aperture stop function can be adjusted easily.

When the user performs an operation to adjust a parameter corresponding to a selected object (third operation, and hereinafter referred to as "parameter adjustment operation") on an operation device, the information processing apparatus according to an embodiment of the present disclosure adjusts a parameter relating to the object determined as a selected object based on a detection value (fifth detection value) obtained by the operation device corresponding to the parameter adjustment operation.

In an embodiment of the present disclosure, the parameter adjustment operation includes an operation performed on the operation device that performs the selection start operation (first operation) and the selection determination operation (second operation).

More specifically, in an embodiment of the present disclosure, the parameter adjustment operation (third operation) includes an operation performed on the rotary-type selector described in the above (c), and an operation performed on a "rotary-type selector having a mechanism for obtaining a ternary or more detection value and a mechanism for obtaining a detection value in response to an rotary operation". When the rotary-type selector described in the above (c) is used, the user performs the selection start operation (first operation) and the selection determination operation (second operation) using a mechanism for obtaining a binary detection value such as a button, and performs the parameter adjustment operation (third operation) using the mechanism for obtaining a detection value in response to the rotary operation. In addition, when the "rotary-type selector having a mechanism for obtaining a ternary or more detection value and a mechanism for obtaining a detection value in response to an rotary operation" is used, the user performs the selection start operation (first operation) and the selection determination operation (second operation) using the mechanism for obtaining a ternary or more detection value such as a two-step push-button switch, which is similar to the case in which the operation device described in the above (b) is used. Then, when the "rotary-type selector having a mechanism for obtaining a ternary or more detection value and a mechanism for obtaining a detection value in response to an rotary operation" is used, the user performs the parameter adjustment operation (third operation) using the mechanism for obtaining a detection value in response to the rotary operation.

The user may perform some operations among various kinds of operations including the selection start operation (first operation), the selection determination operation (second operation), and the parameter adjustment operation (third operation). Some of operations and various kinds of operations may be performed in a separate operation device.

In the following, a case in which the rotary-type selector described in the above (c) is used as an operation device is taken as an example. In the following, as an example, a case in which the user performs the selection start operation (first operation) and the selection determination operation (second operation) on a button (example of the mechanism for obtaining a binary detection value) provided in the rotary-type selector, and performs the parameter adjustment operation (third operation) on the mechanism for obtaining a detection value in response to the rotary operation provided in the rotary-type selector is taken. In other words, in the following, a case in which the parameter adjustment operation is the rotary operation on the rotary-type selector described in the above (c) is taken as an example.

When the display screen shown in B of FIG. 3 is displayed by performing the selection determination operation (second operation) on a button of the rotary-type selector, the user performs the rotary operation on the rotary-type selector. The information processing apparatus according to an embodiment of the present disclosure changes a value of the selected and determined parameter ("F2.5" shown in B of FIG. 3) relating to the aperture stop function based on the detection value (fifth detection value) of the rotary-type selector in response to the rotary operation.

The processing performed by the information processing method according to an embodiment of the present disclosure allows the user to adjust a parameter relating to the selected and determined object by performing the parameter adjustment operation (third operation) on an operation device.

When the selection start operation (first operation), the selection determination operation (second operation), and the parameter adjustment operation (third operation) are performed using the rotary-type selector such as a jog dial corresponding to a push-button switch as described in the above (c), the user can perform the selection start operation (first operation), the selection determination operation (second operation), and the parameter adjustment operation (third operation) as a series of operations. Thus, in the above case, the user can perform the starting of selection of an object, the selection of an object through the line of sight, the determination of selection, and the adjustment of a parameter relating to a selected object, for example without releasing the finger being used for its operation. As a result, it is possible to provide a more comfortable operation experience for the user.

Figure 4:
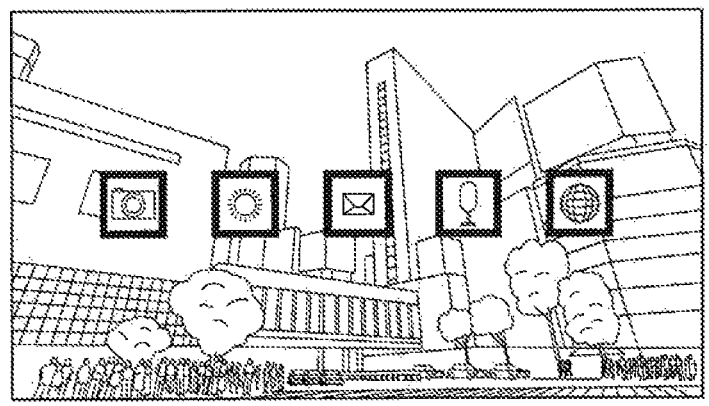
FIG. 4 is an explanatory diagram of an example of an operation performed by an information processing method according to an embodiment of the present disclosure.
Figure 5:
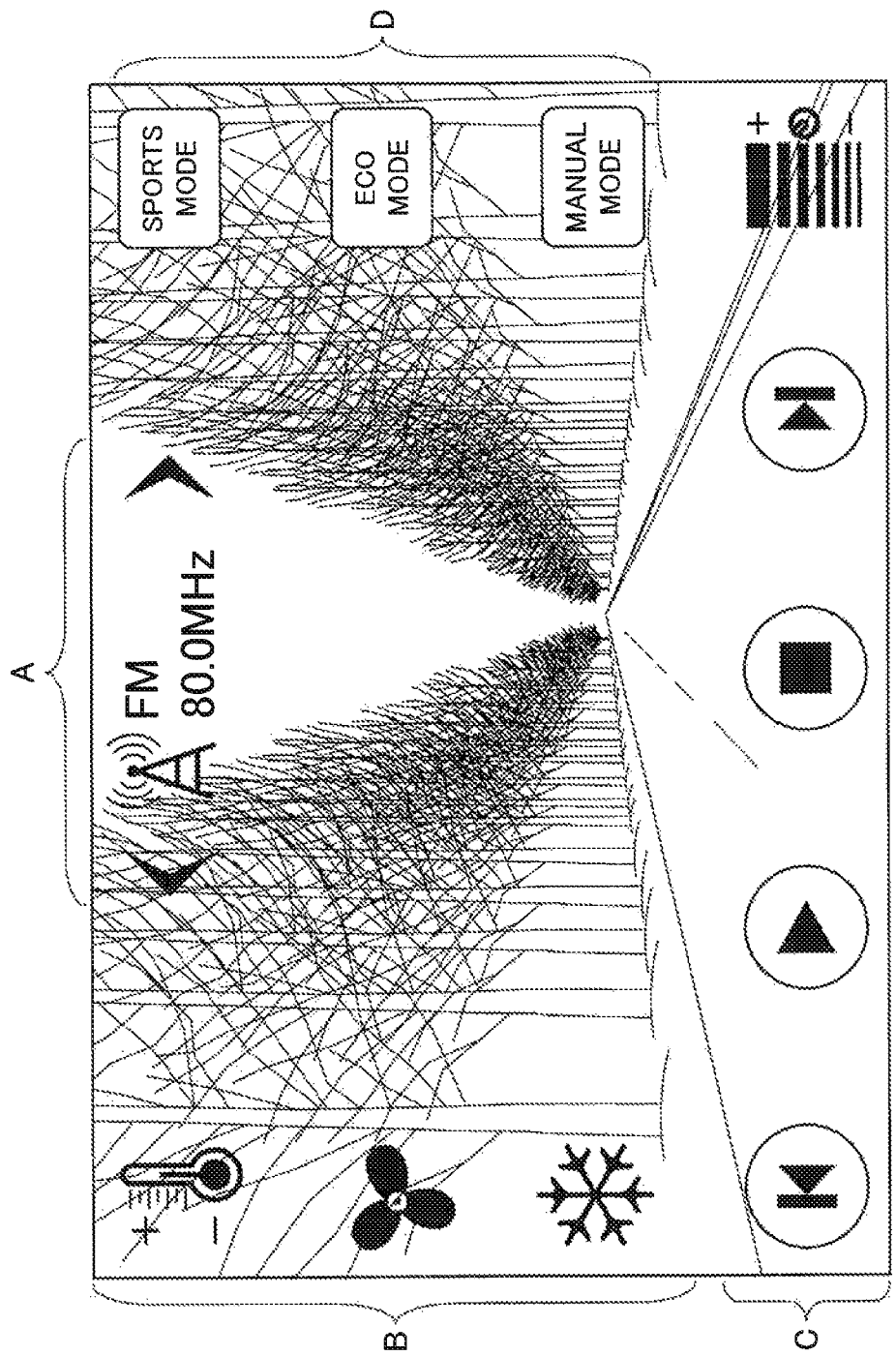
FIG. 5 is an explanatory diagram of an example of an operation performed by an information processing method according to an embodiment of the present disclosure.

(iii) Another example of a target to which information processing apparatus according to embodiment of present disclosure is applicable (FIGS. 4 and 5)

A target to which the information processing apparatus according to an embodiment of the present disclosure is applicable is not limited to the examples illustrated with reference to FIG. 1 or 3.

FIG. 4 illustrates an example of a screen displayed on a display screen, for example, of a transparent HMD and illustrates a display screen on which a plurality of icons are displayed in the active state.

FIG. 5 illustrates an example of a screen displayed on a display screen of a vehicle such as automobiles and trains, and illustrates a display screen of an automobile on which a plurality of icons are displayed in the active state. The icon shown in the portion indicated by A of FIG. 5 is an icon that is associated with a process of radio tuning. The icons shown in the portion indicated by B of FIG. 5 are icons that are associated with the process relating to the control of air conditioning. The icons shown in the portion indicated by C of FIG. 5 are icons that are associated with the process relating to reproduction of audio. The icons shown in the portion indicated by D of FIG. 5 are icons that are associated with the process relating to the control of driving mode.

The operation relating to the first example described in the above (i) or the operation relating to the second example described in the above (ii) are applicable to the transparent HMD and the vehicle shown in FIGS. 4 and 5.

Process relating to the information processing apparatus according to an embodiment of the present disclosure A process performed by the information processing method according to an embodiment of the present disclosure will be described. The process is able to implement the operation performed by the information processing method according to an embodiment of the present disclosure described above.

The information processing apparatus according to an embodiment of the present disclosure performs, for example, (1) line-of-sight position acquisition process, (2) state control process, and (3) execution process, described below, as a process performed by the information processing method according to an embodiment of the present disclosure.

(1) Line-of-Sight Position Acquisition Process

The information processing apparatus according to an embodiment of the present disclosure acquires, for example, a line-of-sight position of the user. The information processing apparatus according to an embodiment of the present disclosure, for example, acquires information relating to the position of the line-of-sight of the user, and acquires the line-of-sight position of the user by specifying the line-of-sight position of the user based on the information relating to the acquired line-of-sight position of the user.

In the information processing apparatus according to an embodiment of the present disclosure or an external device, when the user is specified using face recognition or other techniques, the information processing apparatus according to an embodiment of the present disclosure is also able to acquire the line-of-sight position of a particular user among a plurality of users.

The information relating to the user's line-of-sight position according to an embodiment of the present disclosure includes, for example, data indicating the user's line-of-sight position or data used to specify the user's line-of-sight position (or data that can be used to estimate the user's line-of-sight position, and the same applies hereinafter).

In an embodiment of the present disclosure, the data indicating the line-of-sight position of the user includes, for example, "coordinate data indicating a user's line-of-sight position on a display screen". The user's line-of-sight position on a display screen is represented by, for example, coordinates in the coordinate system in which a reference position on a display screen is set as an origin point. In an embodiment of the present disclosure, the reference position in a display screen may be a preset fixed position, or may be a position that can be set by the user's operation or the like.

In an embodiment of the present disclosure, when coordinate data indicating the line-of-sight position of the user on the display screen is used as information relating to the user's line-of-sight position, the information processing apparatus acquires the line-of-sight position of the user by specifying a position of a line of sight of the user on a display screen using the coordinate data indicating the position of a line of sight of the user on a display screen. The coordinate data is obtained from an external device in which the position of a line of sight of the user is specified (or estimated) using the line-of-sight detection technologies.

The line-of-sight position of the user on a display screen may be specified by a line-of-sight data that is detected using the line-of-sight detection technology and using the user's position or face orientation with respect to a display screen. The user's position or face orientation is detected from a captured image obtained by capturing the direction in which an image (moving or still image) is displayed on a display screen. In an embodiment of the present disclosure, the direction of a displayed image is the direction in which an image displayed on a display screen is visible to the user.

The method of specifying the user's line-of-sight position in a display screen in an embodiment of the present disclosure is not limited to the example described above. In an embodiment of the present disclosure, the information processing apparatus or an external device may employ any technique capable of specifying the user's line-of-sight position on a display screen.

In an embodiment of the present disclosure, the line-of-sight detection technology includes, for example, a method of detecting the line of sight based on the position of a moving point of the eye (for example, a point corresponding to a moving portion in the eye such as iris and pupil) with respect to a reference point of the eye (for example, a point corresponding to a portion that does not move in the eye such as an eye's inner corner or corneal reflex). The line-of-sight detection technology used in an embodiment of the present disclosure is not limited to the example described above. For example, in an embodiment of the present disclosure, the information processing apparatus or an external device is able to detect the line of sight of the user by any line-of-sight detection technology using "corneal reflex technique", "pupil center corneal reflection technique", "sclera reflection technique", and "active appearance model (AAM) for tracking features points obtained from the eyes, nose, mouth, or the like, after detection of face".

However, in an embodiment of the present disclosure, the data indicating the user's line-of-sight position is not limited to the above "coordinate data indicating the user's line-of-sight position on the display screen".

For example, when the user wears a transparent head mounted display (hereinafter, abbreviated as "HMD"), in an embodiment of the present disclosure, data indicating the user's line-of-sight position may be "coordinate data indicating the position on a real object in a real space viewed by the user".

The position on a real object in a real space viewed by the user, is specified (or estimated), for example, based on a three-dimensional image of the real object and the line-of-sight vector. The line-of-sight vector is specified (or estimated) using the line-of-sight detection technology. The method of specifying the position on a real object in a real space viewed by the user, is not limited to the example described above, and is able to employ any technology capable of specifying a position on a real object in a real space, which is being viewed by the user.

In an embodiment of the present disclosure, when coordinate data indicating a position on a real object in a real space viewed by the user is used as information relating to the user's line-of-sight position, the information processing apparatus acquires the user's line-of-sight position by specifying a position of the line of sight of the user on the real object using the coordinate data that indicates a position on a real object in a real space viewed by the user and is obtained from an external device.

In an embodiment of the present disclosure, the data that can be used to specify a user's line-of-sight position includes, for example, a captured image data that is obtained by capturing the direction in which an image is displayed on a display screen (captured image data obtained by capturing in the direction that faces a display screen from the display screen side). In an embodiment of the present disclosure, the data that can be used to specify the user's line-of-sight position may further include detection data of any sensor for obtaining a detection value that can be used to improve estimation accuracy of the user's line-of-sight position such as detection data of an infrared sensor that detects infrared radiation in the direction in which images are displayed on the display screen.

In an embodiment of the present disclosure, examples of the data used in specifying a user's line-of-sight position include a three-dimensional image of a real object and data used to specify the line-of-sight vector of the user.

In an embodiment of the present disclosure, when data that can be used to specify the user's line-of-sight position is used as information relating to the user's line-of-sight position, the information processing apparatus according to an embodiment of the present disclosure uses, for example, captured image data acquired by an imaging unit (described later) provided in the information processing apparatus or an external imaging device. In the above case, the information processing apparatus according to an embodiment of the present disclosure may use, for example, detection data (example of data that can be used to specify the user's line-of-sight position) acquired from a sensor which can be used to improve estimation accuracy of the user's line-of-sight position and is provided in the information processing apparatus according to an embodiment of the present disclosure or an external sensor.

In an embodiment of the present disclosure, when the data that can be used to specify a user's line-of-sight position is employed as information relating to the user's line-of-sight position, the information processing apparatus may use a three-dimensional image and data used to specify a line-of-sight vector of the user. The three-dimensional image is stored in a storage unit (as described later) provided in the information processing apparatus or an external recording medium. The data used to specify the line-of-sight vector of the user includes a captured image data or other like data that is captured by an imaging unit (as described later) or other like imaging devices.

For example, in an embodiment of the present disclosure, when the data that can be used to specify a user's line-of-sight position is employed, the information processing apparatus acquires the user's line-of-sight position by specifying a position of the line of sight of the user using a process in accordance with a method for specifying a position of the line of sight of the user as described above.

The information processing apparatus according to an embodiment of the present disclosure acquires a user's line-of-sight position, for example, by the process as described above.

The information processing apparatus according to an embodiment of the present disclosure acquires a user's line-of-sight position regardless of the user's operation on an operation device, but the line-of-sight position acquisition process according to an embodiment of the present disclosure is not limited to the example described above.

For example, the information processing apparatus according to an embodiment of the present disclosure may acquire a user's line-of-sight position in the active state. More specifically, the information processing apparatus according to an embodiment of the present disclosure acquires a user's line-of-sight position in the active state in which the user presses a button (example of an operation device), and prevents a user's line-of-sight position from being acquired in the inactive state in which the user releases the button.

As described above, the user's line-of-sight position is acquired in the active state, and thus the information processing apparatus according to an embodiment of the present disclosure may control power consumption of the line-of-sight position acquisition process (power consumption of the information processing apparatus according to an embodiment of the present disclosure or power consumption of an external device such as an external imaging device).

(2) State Control Process

The information processing apparatus according to an embodiment of the present disclosure, for example, may perform a transition to the active state in response to the selection start operation (first operation). The information processing apparatus according to an embodiment of the present disclosure, for example, may perform a transition from the inactive state to the active state in response to the selection start operation.

For example, as shown in FIG. 1, the information processing apparatus according to an embodiment of the present disclosure prevents a plurality of objects from being displayed in the inactive state, and performs a transition to the active state by displaying a plurality of objects on a display screen. The information processing apparatus according to an embodiment of the present disclosure allows a plurality of objects to be displayed by transmitting a control signal including a display control command to a display unit (as described later) or an external display device. The control signal may contain object data to be displayed.

The information processing apparatus according to an embodiment of the present disclosure may perform a transition to the active state by performing a transition to a state in which an object, which is displayed on a display screen but is prevented from being selected through the line of sight in the inactive state, can be selected through the line of sight. The information processing apparatus according to an embodiment of the present disclosure performs a transition to a state in which a plurality of objects can be selected through the line of sight, by transmitting a control signal including a display control command to a display unit (as described later) or an external display device.

If the information processing apparatus according to an embodiment of the present disclosure is in the inactive state, the information processing apparatus may allow an guidance object to be displayed at a position of a display screen in which a plurality of objects are displayed in the active state, for example, as shown in FIG. 2.

(2-1) First Example of State Control Process: Example of State Control Process in Performing Selection State Operation (First Operation)

As a first example of the state control process, there will be described a state control process in performing the selection start operation (first operation) on the mechanism for obtaining a binary detection value of the operation device described in the above (a) or the rotary-type selector described in the above (c).

The information processing apparatus according to an embodiment of the present disclosure performs a transition to the active state when a detection value in response to the selection start operation is detected in the inactive state. The detection value, which is detected based on the selection start operation on the mechanism for obtaining a binary detection value of the operation device described in the above (a) or the rotary-type selector described in the above (c), includes detection values described below.

Detection value of the operation device corresponding to a state of being operated (first detection value)

Combination of a detection value of the operation device corresponding to a state of being operated (first detection value) and a detection value of the operation device corresponding to astute of not being operated (second detection value)

More specifically, when the selection start operation (first operation) allows the operation device to perform a transition to a state of being operated from a state of not being operated such as an operation of pressing a button that is in a state of not being pressed, the information processing apparatus according to an embodiment of the present disclosure performs a transition to the active state upon the detection of the detection value (first detection value) of the operation device corresponding to a state of being operated.

Furthermore, when the selection start operation (first operation) allows the operation device to perform a transition to a state of being operated from a state of not being operated such as an operation of releasing a button by pressing the button that is in a state of not being pressed, and then allows the operation device to perform a transition a state of not being operated from a state of being operated, the information processing apparatus according to an embodiment of the present disclosure performs a transition to the active state upon the detection of a combination of a detection value of the operation device corresponding to a state of being operated (first detection value) and a detection value of the operation device corresponding to a state of not being operated (second detection value).

(2-2) Second Example of State Control Process: Another Example of State Control Process in Performing Selection State Operation (First Operation)

As a second example of the state control process, there will be described a state control process in performing the selection start operation (first operation) on the operation device described in the above (b).

When the information processing apparatus according to an embodiment of the present disclosure is in the inactive state, the information processing apparatus performs a transition to the active state upon detection of a detection value (third detection value) of the operation device corresponding to a state of being subjected to the selection start operation. For example, if the operation device described in the above (b) is a two-step push-button switch, the information processing apparatus according to an embodiment of the present disclosure performs a transition to the active state when the user presses halfway the switch that is being not pressed.

When the detection value (second detection value) of the operation device corresponding to a state of not being operated is detected after the information processing apparatus according to an embodiment of the present disclosure is in the active state, the information processing apparatus performs a transition from the active state to the inactive state. For example, if the operation device described in the above (b) is a two-step push-button switch, the information processing apparatus according to an embodiment of the present disclosure performs a transition from the inactive state to the active state when the user releases the button that is pressed halfway. The transition from the inactive state to the active state allows the cancellation of selection of an object described in the above (i-3) to be implemented.

(2-3) Third Example of State Control Process: Another Example of State Control Process for Cancellation of Selection of Object The information processing apparatus according to an embodiment of the present disclosure performs a transition from the active state to the inactive state, for example, when a plurality of objects are not determined as a selected object because there is no object corresponding to the line-of-sight position in a process of (3) described later.

The information processing apparatus according to an embodiment of the present disclosure performs a transition from the active state to the inactive state, for example, when an object determined as an object selected in a process of (3) (execution process) described later is an object associated with a process for terminating a process relating to the selection of an object.

The information processing apparatus according to an embodiment of the present disclosure implements the cancellation of selection of an object described in the above (i-3) by performing a transition from the active state to the inactive state.

(3) Execution Process

The information processing apparatus according to an embodiment of the present disclosure determines an object corresponding to the line-of-sight position acquired in the process (line-of-sight position acquisition process) of the above (1) as a selected object in response to the selection determination operation (second operation) on the operation device after the selection start operation is performed.

The operation device on which the user performs the selection start operation and the operation device on which the user performs the selection determination operation may be the same operation device. The selection start operation and the selection determination operation performed on the same operation device allow the user to start the selection of an object and to determine the selection of an object by performing a series of operations using the relevant operation device or performing the same operation on the relevant operation device. As described above, it is noted that the operation device on which the user performs the selection start operation and the operation device on which the user performs the selection determination operation may be separate operation devices.

(3-1) First Example of Execution Process: Example of Execution Process in Performing Selection Determination Operation (Second Operation)

As a first example of the execution process, there will be described the execution process in the case in which the selection determination operation (second operation) is performed on the operation device described in the above (a) or the mechanism for obtaining a binary detection value of the rotary-type selector described in the above (c).

When a detection value based on the selection determination operation is detected after a transition to the active state is performed in the process of the above (2) (state control process), the information processing apparatus according to an embodiment of the present disclosure determines an object corresponding to the line-of-sight position acquired in the process of the above (1) (line-of-sight position acquisition process) as a selected object. The detection value detected based on the selection determination operation on the operation device described in the above (a) or the mechanism for obtaining a binary detection value of the rotary-type selector described in the above (c) includes, for example, a detection value described below.

Detection value of the operation device corresponding to a state of not being operated (second detection value)

Combination of a detection value of the operation device corresponding to state of being operated (first detection value) and a detection value of the operation device corresponding to a state of not being operated (second detection value)

More specifically, in the case in which the selection determination operation (second operation) is an "operation allowing an operation device to perform a transition from a state of being operated to a state of not being operated such as an operation of releasing a button being pressed", the information processing apparatus according to an embodiment of the present disclosure determines an object corresponding to the line-of-sight position as a selected object upon detection of a detection value of an operation device corresponding to the state of not being operated (second detection value).

Furthermore, in the case in which the selection determination operation (second operation) is an "operation allowing an operation device to perform a transition from a state of not being operated to a state of being operated and then perform a transition from a state of being operated to a state of not being operated, such as an operation of releasing by pressing a button being not pressed", the information processing apparatus according to an embodiment of the present disclosure determines an object corresponding to the line-of-sight position as a selected object when a combination of a detection value of the operation device corresponding to a state of being operated (first detection value) and a detection value of the operation device corresponding to a state of not being operated (second detection value) is detected after the active state is set.

The information processing apparatus according to an embodiment of the present disclosure, for example, prevents a plurality of objects from being determined as a selected object, when there is no object corresponding to the line-of-sight position acquired in the process of the above (1) (line-of-sight position acquisition process). When the object selected in the execution process is not determined, the information processing apparatus according to an embodiment of the present disclosure, as described above, performs a transition from the active state to the inactive state in the process of the above (2) (state control process).

(3-2) Second Example of Execution Process: Another Example of Execution Process in Performing Selection Determination Operation (Second Operation)

As a second example of the execution process, there will be described the execution process in performing the selection determination operation (second operation) on the operation device described in the above (b).

The information processing apparatus according to an embodiment of the present disclosure determines an object corresponding to the line-of-sight position as a selected object when a detection value of the operation device corresponding to the state of being subjected to the selection determination operation (fourth detection value) is detected after a transition to the active state is performed by the process of the above (2) (state control process). For example, if the operation device described in the above (b) is a two-step push-button switch, the information processing apparatus according to an embodiment of the present disclosure determines an object corresponding to the line-of-sight position as a selected object when the user further presses the switch that is being pressed halfway.

(3-3) Third Example of Execution Process: Execution Process in Performing Parameter Adjustment Operation (Third Operation)

When the user performs the selection determination operation (second operation) and then performs the parameter adjustment operation (third operation), the information processing apparatus according to an embodiment of the present disclosure adjusts a parameter relating to the determined object based on the parameter adjustment operation, for example as described with reference to B of FIG. 3.

The information processing apparatus according to an embodiment of the present disclosure adjusts a parameter based on the detection value (fifth detection value) of the operation device corresponding to the parameter adjustment operation (third operation). More specifically, in an embodiment of the present disclosure, when the operation is, for example, the rotary-type selector including the mechanism for obtaining a detection value in response to the rotary operation such as the rotary-type selector described in the above (c) and the parameter adjustment operation (third operation) is the rotary operation performed on the mechanism, the information processing apparatus according to an embodiment of the present disclosure adjusts a parameter by increasing or decreasing a value of the parameter based on the detection value (fifth detection value) in response to the rotary operation.

(3-4) Other Example of Execution Process

The information processing apparatus according to an embodiment of the present disclosure may perform a process associated with an object determined as a selected object. Such a process includes, for example, an operation of activating an application associated with the determined object.

The information processing apparatus according to an embodiment of the present disclosure performs, for example, the process of the above (1) (line-of-sight position acquisition process), the process of the above (2) (state control process), and the process of the above (3) (execution process), as the process performed in accordance with the information processing method according to an embodiment of the present disclosure.

The information processing apparatus according to an embodiment of the present disclosure allows the selection of an object through a line of sight to be started based on the selection determination operation (first operation) performed by a user in the process of the above (2) (state control process). In addition, the information processing apparatus according to an embodiment of the present disclosure determines an object corresponding to the line-of-sight position acquired in the process of the above (1) (line-of-sight position acquisition process) as a selected object, based on the selection determination operation (second operation) in the process of the above (3) (execution process).

Thus, the process of the above (1) (line-of-sight position acquisition process), the process of the above (2) (state control process), and the process of the above (3) (execution process) which are performed by the information processing apparatus according to an embodiment of the present disclosure allow the user to select an object by directing a line of sight to the object, and allow the user to determine the selection of the object in a short time and in a reliable way. In addition, the process of the above (1) (line-of-sight position acquisition process), the process of the above (2) (state control process), and the process of the above (3) (execution process) which are performed by the information processing apparatus according to an embodiment of the present disclosure allow the user to select an object through the line of sight of the user as user's intention using the operation on the operation device as a trigger and prevent an object unintended by the user from being selected.

Thus, the information processing apparatus according to an embodiment of the present disclosure achieves an improvement in the usability. In addition, the information processing apparatus according to an embodiment of the present disclosure makes the user's operation experience more comfortable.

Specific example of processing performed in accordance with information processing method according to embodiment of present disclosure A specific example of processing performed in accordance with the information processing method according to an embodiment of the present disclosure described above will be described. In the following, the description is based on the assumption that the operation device according to an embodiment of the present disclosure is a button (example of the operation device described in the above (a)) capable of obtaining a binary detection value using a pressing operation performed by the user. Note that the specific example of processing performed in accordance with the information processing method according to an embodiment of the present disclosure described above is not limited to examples described below.

Figure 6:
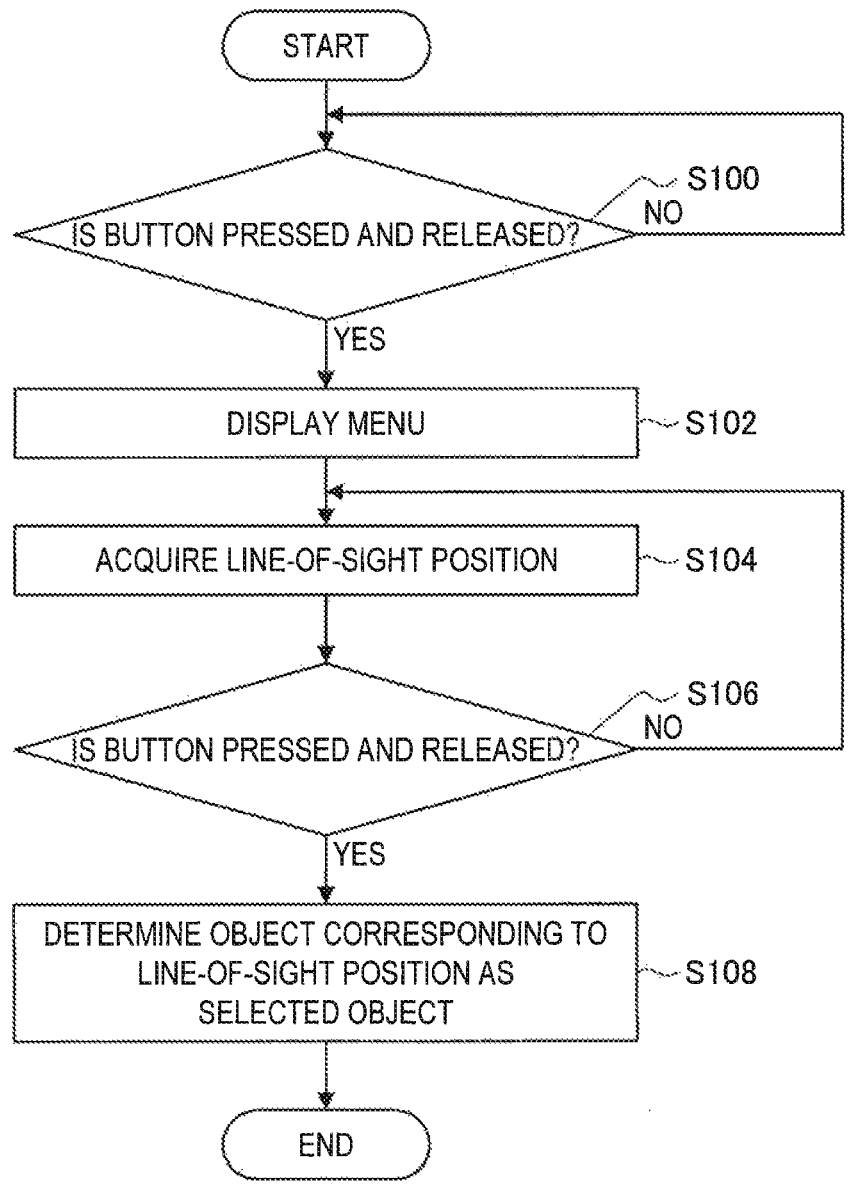
FIG. 6 is a flowchart illustrated to describe a first example of processing performed by an information processing method according to an embodiment of the present disclosure.

(I) First Example of Processing Performed in Accordance with Information Processing Method According to Embodiment of Present Disclosure FIG. 6 is a flowchart to describe a first example of the processing performed in accordance with the information processing method according to an embodiment of the present disclosure. In FIG. 6, for example, the process of steps S100 and S102 corresponds to an example of the process of the above (2) (state control process), and the process of step S104 corresponds to an example of the process of the above (1) (line-of-sight position acquisition process). In FIG. 6, for example, the process of steps S106 and S108 corresponds to an example of the process of the above (3) (execution process).

In FIG. 6, although the process of step S104 corresponding to an example of the process of the above (1) (line-of-sight position acquisition process) is performed subsequent to the process of step S102, the process of the above (1) (line-of-sight position acquisition process) may be performed, for example, in a continuous, regular, or irregular manner.

The information processing apparatus according to an embodiment of the present disclosure determines whether a button is pressed and released (S100). The operation of pressing a button to be released by a user according to the determination of step S100 corresponds to an example of the selection start operation (first operation).

For example, if a combination of a detection value of an operation device corresponding to a state of being operated (first detection value) and a detection value of an operation device corresponding to a state of not being operated (second detection value), the information processing apparatus according to an embodiment of the present disclosure determines that the button is pressed and released.

If it is not determined that the button is pressed and released in step S100, the information processing apparatus according to an embodiment of the present disclosure keeps the process from proceeding until it is determined that the button is pressed and released.

If it is determined that the button is pressed and released in step S100, the information processing apparatus according to an embodiment of the present disclosure allows a menu to be displayed on a display screen by displaying a plurality of objects such as a plurality of icons, for example, as shown in B of FIG. 1 (S102). The process of step S102 allows a plurality of objects constituting the menu to be in a state capable of selection through a line of sight, that is, the active state.

If the menu is displayed in step S102, the information processing apparatus according to an embodiment of the present disclosure acquires a line-of-sight position (S104).

The information processing apparatus according to an embodiment of the present disclosure determines whether a button is pressed and released (S106), which is similar to step S100. The operation of pressing and releasing a button by a user according to the determination of step S106, and it corresponds to an example of the selection determination operation (second operation).

If it is not determined that the button is pressed and released in step S106, the information processing apparatus according to an embodiment of the present disclosure returns the process to step S104 and repeats the process.

If it is determined that the button is pressed and released in step S106, for example, the information processing apparatus according to an embodiment of the present disclosure determines an object corresponding to the most recently acquired line-of-sight position in step S104 from among a plurality of objects constituting the menu as a selected object (S108).

The information processing apparatus according to an embodiment of the present disclosure performs, for example, the process shown in FIG. 6 as the process performed in accordance with the information processing method according to an embodiment of the present disclosure. For example, the process shown in FIG. 6 implements the process described in the above (1) (line-of-sight position acquisition process), the process of the above (2) (state control process), and the process of the above (3) (execution process). Thus, for example, the process shown in FIG. 6 allows the information processing apparatus according to an embodiment of the present disclosure to achieve an improvement in the usability. Moreover, for example, the process shown in FIG. 6 allows the information processing apparatus according to an embodiment of the present disclosure makes the user's operation experience more comfortable.

Figure 7:
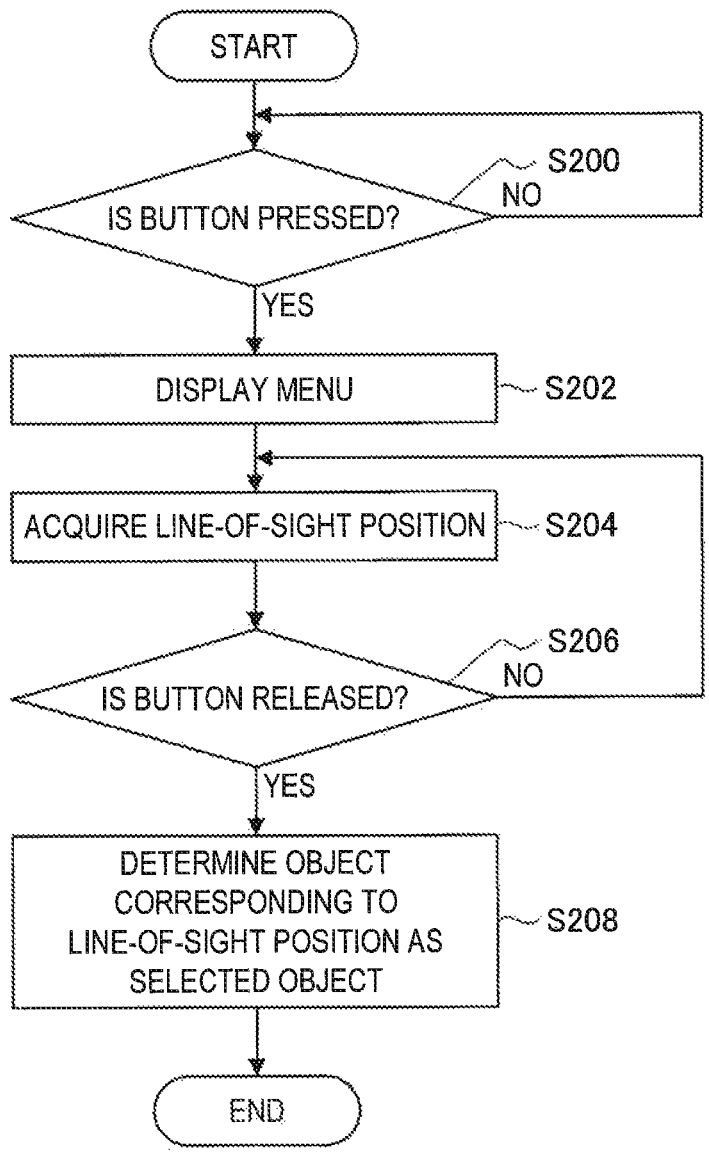
FIG. 7 is a flowchart illustrated to describe a second example of processing performed by an information processing method according to an embodiment of the present disclosure.

(II) Second Example of Processing Performed in Accordance with Information Processing Method According to Embodiment of Present Disclosure FIG. 7 is a flowchart to describe a second example of the processing performed in accordance with the information processing method according to an embodiment of the present disclosure. In FIG. 7, for example, the process of steps S200 and S202 corresponds to an example of the process of the above (2) (state control process), and the process of step S204 corresponds to an example of the process of the above (1) (line-of-sight position acquisition process). In addition, in FIG. 7, for example, the process of steps S206 and S208 corresponds to an example of the process of the above (3) (execution process).

In FIG. 7, although the process of step S204 corresponding to an example of the process of the above (1) (line-of-sight position acquisition process) is performed subsequent to the process of step S202, the process of the above (1) (line-of-sight position acquisition process) may be performed, for example, in a continuous, regular, or irregular manner.

The information processing apparatus according to an embodiment of the present disclosure determines whether a button is pressed (S200). The operation of pressing a button by a user according to the determination of step S200 corresponds to an example of the selection start operation (first operation).

The information processing apparatus according to an embodiment of the present disclosure determines that the button is pressed, for example, when a detection value of an operation device corresponding to a state of being operated (first detection value) is detected.

If it is not determined that the button is pressed in step S200, the information processing apparatus according to an embodiment of the present disclosure keeps the process from proceeding until it is determined that the button is pressed.

If it is determined that the button is pressed in step S200, the information processing apparatus according to an embodiment of the present disclosure allows a menu to be displayed on a display screen (S202) in a similar way to step S102 in FIG. 6.

If the menu is displayed in step S202, the information processing apparatus according to an embodiment of the present disclosure acquires a line-of-sight position (S204).

The information processing apparatus according to an embodiment of the present disclosure determines whether the button being pressed is released (S206). The operation of releasing the button by the user according to the determination of step S206 corresponds to an example of the selection determination operation (second operation).

The information processing apparatus according to an embodiment of the present disclosure determines that the button is released, for example, when a detection value of an operation device corresponding to a state of not being operated (second detection value) is detected.

If it is not determined that the button is released in step S206, the information processing apparatus according to an embodiment of the present disclosure returns the process to step S204 and repeats the process.

If it is determined that the button is released in step S206, for example, the information processing apparatus according to an embodiment of the present disclosure performs a determination of a selected object (S208) in a similar way to step S108 in FIG. 6.

The information processing apparatus according to an embodiment of the present disclosure performs, for example, the process shown in FIG. 7 as the process performed in accordance with the information processing method according to an embodiment of the present disclosure. For example, the process shown in FIG. 7 implements the process described in the above (1) (line-of-sight position acquisition process), the process of the above (2) (state control process), and the process of the above (3) (execution process). Thus, for example, the process shown in FIG. 7 allows the information processing apparatus according to an embodiment of the present disclosure to achieve an improvement in the usability. Moreover, for example, the process shown in FIG. 7 allows the information processing apparatus according to an embodiment of the present disclosure makes the user's operation experience more comfortable.

The processing performed in accordance with the information processing method relating to the second example shown in FIG. 7 allows the user to perform the selection start operation (first operation) and the selection determination operation (second operation) with fewer operations than the case in which the first example of the process shown in FIG. 6 is performed in accordance with the information processing method according to an embodiment of the present disclosure. Thus, when the second example of the process shown in FIG. 7 is performed in accordance with the information processing method according to an embodiment of the present disclosure, the user can perform the operations more swiftly than the case in which the first example of the process shown in FIG. 6 is performed in accordance with the information processing method according to an embodiment of the present disclosure.

The processing performed in accordance with the information processing method relating to the second example shown in FIG. 7 allows the user to start the selection of an object through the line of sight of the user and to determine the selection of an object by just a single click of a button to release the button by pressing it. Thus, the user memorizes a position at which a frequently selected object is displayed and performs a just single click of a button while viewing the display position, and as a result, the process corresponding to the relevant object can be performed.

(Information processing Apparatus According to Embodiment of Present Disclosure)

Next, an example of the configuration of an information processing apparatus according to an embodiment of the present disclosure, capable of performing the process in accordance with the information processing method according to an embodiment of the present disclosure described above will be described.

Figure 8:
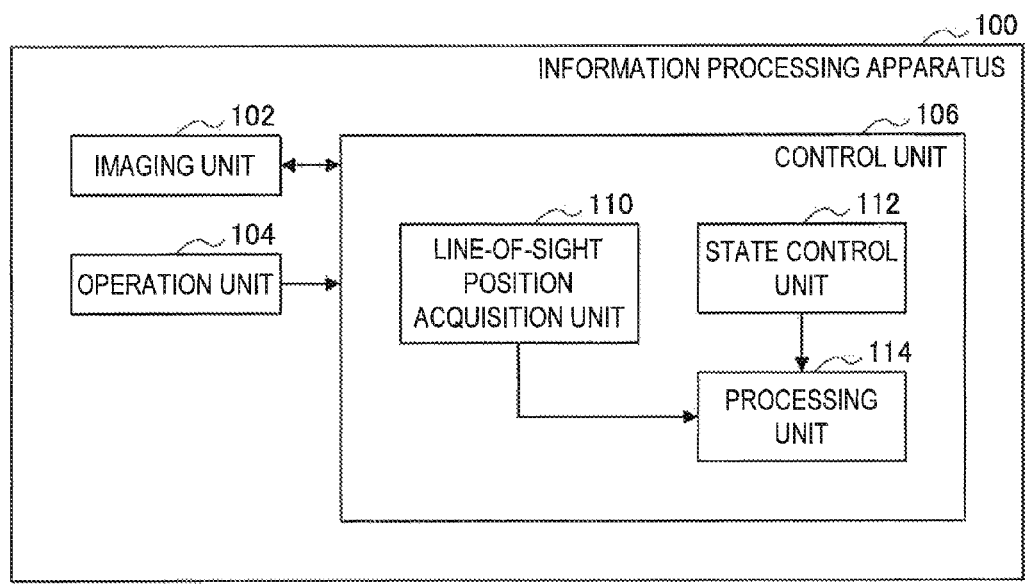
FIG. 8 is a block diagram illustrating an exemplary configuration of an information processing apparatus according to an embodiment of the present disclosure.

FIG. 8 is a block diagram illustrating an example of the configuration of an information processing apparatus 100 according to an embodiment of the present disclosure. The information processing apparatus 100 is configured to include, for example, an imaging unit 102, an operation unit 104, and a control unit 106.

The information processing apparatus 100 may also be configured to include, for example, a read only memory (ROM, not shown in figures), a random access memory (RAM, not shown), a storage unit (not shown), a communication unit (not shown), and a display unit (not shown) that displays various images on a display screen. In the information processing apparatus 100, the components described above are interconnected by, for example, a bus used as a transmission path.

The ROM (not shown) stores programs used by the control unit 106 and control data such as operation parameters. The RAM (not shown) temporarily stores programs and the like executed by the control unit 106.

The storage unit (not shown) is a storage means provided in the information processing apparatus 100 and stores, for example, data used to perform the information processing method according to an embodiment of the present disclosure such as information relating to the position of a line of sight of the user, data indicating an object, and various data such as applications. The storage unit (not shown) includes a magnetic recording medium such as hard disks and a nonvolatile memory such as flash memory. The storage unit (not shown) may be removable from the information processing apparatus 100.

The communication unit (not shown) includes, for example, a communication interface described later. The display unit (not shown) includes, for example, a display device described later.

(Hardware Configuration Example of Information Processing Apparatus 100)

Figure 9:
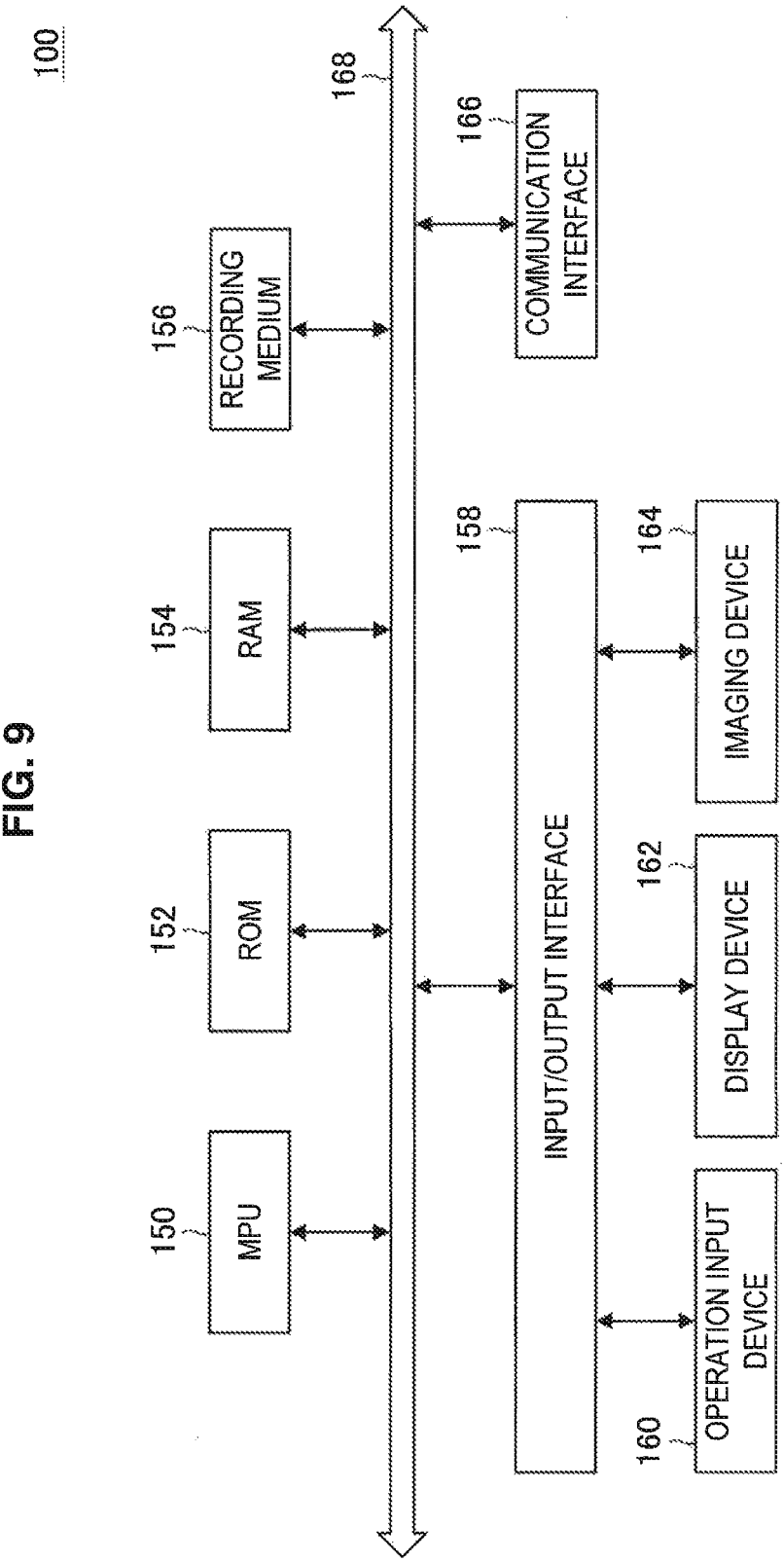
FIG. 9 is an explanatory diagram of an example of the hardware configuration of an information processing apparatus according to an embodiment of the present disclosure.

FIG. 9 is an explanatory diagram showing an example of the hardware configuration of the information processing apparatus 100 according to an embodiment of the present disclosure. The information processing apparatus 100 is configured to include, for example, an MPU 150, ROM 152, RAM 154, a recording medium 156, an input/output interface 158, an operation input device 160, a display device 162, an imaging device 164, and a communication interface 166. In the information processing apparatus 100, the components are interconnected by, for example, a bus 168 used as a data transmission path.

The MPU 150 is configured to include a processor constituted by arithmetic and processing circuits such as a micro processing unit (MPU) and various processing circuits, and the MPU 150 functions as the control unit 106 for controlling the overall operation of the information processing apparatus 100. The MPU 150 serves as a line-of-sight position acquisition unit 110, a state determination unit 112, and a processing unit 114 described later, which are included in the information processing apparatus 100.

The ROM 152 stores programs used by the MPU 150 and stores control data such as operation parameters. The RAM 154 temporarily stores programs and the like executed by the MPU 150.

The recording medium 156 functions as a storage unit (not shown), and stores, for example, data used to perform the information processing method according to an embodiment of the present disclosure such as information on the position of a line of sight of the user, data indicating an object, and various data such as applications. The recording medium 156 includes, for example, a magnetic recording medium such as hard disks and a nonvolatile memory such as flash memory. The recording medium 156 may be removable from the information processing apparatus 100.

The input/output interface 158 is connected to, for example, the operation input device 160, the display device 162, and an imaging device 164. The operation input device 160 functions as the operation unit 104. The display device 162 functions as a display unit (not shown). The imaging device 164 functions as the imaging unit 102. The input/output interface 158 includes, for example, a universal serial bus (USB) terminal, a digital visual interface (DVI) terminal, a high-definition multimedia interface (HDMI, registered trademark) terminal, and various processing circuits.

The operation input device 160 is provided, for example, on the information processing apparatus 100, and is connected to the input/output interface 158 in the information processing apparatus 100. The operation input device 160 includes, for example, operation devices according to an embodiment of the present disclosure, such as the operation device described in the above (a), the operation device described in the above (b), and the rotary-type selector described in the above (c). The operation input device 160 may be configured to include, for example, arrow keys and other keys.

The display device 162 is provided, for example, on the information processing apparatus 100, and is connected to the input/output interface 158 in the information processing apparatus 100. The display device 162 includes, for example, a liquid crystal display and an organic electroluminescence display (it is also referred to as an organic light emitting diode (OLEO) display).

The imaging device 164 is provided, for example, on the information processing apparatus 100, and is connected to the input/output interface 158 in the information processing apparatus 100. The information processing apparatus 100 provided with the imaging device 164 can obtain information relating to the line of sight of the user based on the captured image that is generated by capturing in the image device 164.

The imaging device according to an embodiment of the present disclosure is configured to include, for example, a lens/image sensor and a signal processing circuit. The lens/image sensor is configured to include, for example, an optical lens and an image sensor using a plurality of imaging elements such as complementary metal oxide eemiconductor (CMOS). The signal processing circuit is configured to include, for example, an automatic gain control (AGC) circuit or an analog to digital converter (ADC) to convert an analog signal generated by the image sensor into a digital signal (image data). The signal processing circuit may perform various kinds of signal processing, such as, the white balance correction processing, tone correction processing, gamma correction processing, YCbCr conversion processing, and edge enhancement processing.

The input/output interface 158 may be connected to an external device such as an operation input device (for example, keyboards and mice), a display device, and an imaging device, used as an external device of the information processing apparatus 100. The display device 162 may be any device that is capable of performing the display or operation by the user, such as touch-sensitive devices. When the display device 162 is a device that is capable of performing the display or operation by the user such as touch-sensitive devices, the display device 162 may serve as the operation device according to an embodiment of the present disclosure.

The communication interface 166 is a communication means provided in the information processing apparatus 100 and functions as a communication unit (not shown) to communicate with an external device or an external apparatus, such as an external imaging device, an external display device, and an external sensor, via a network (or directly) wirelessly or through a wire. The communication interface 166 includes, for example, a communication antenna and radio frequency (RF) circuit (wireless communication), an IEEE802.15.1 port and transmitting/receiving circuit (wireless communication), an IEEE802.11 port and transmitting/receiving circuit (wireless communication), and a local area network (LAN) terminal and transmitting/receiving circuit (wire communication). The network according to an embodiment of the present disclosure includes, for example, a wire network such as LAN and wide area network (WAN), a wireless network such as wireless LAN (WLAN: Wireless Local Area Network.) and wireless WAN (WWAN: Wireless Wide Area Network) via a base station, and the Internet using the communication protocol such as transmission control protocol/internet protocol (TCP/IP).

With the configuration shown in FIG. 9, for example, the information processing apparatus 100 performs processing in accordance with the information processing method of an embodiment of the present disclosure. However, the hardware configuration of the information processing apparatus 100 according to an embodiment of the present disclosure is not limited to the configuration shown in FIG. 9.

For example, the information processing apparatus 100 may be configured to further include at least one sensor that serves as detection units (not shown) for obtaining data used for performing the process in accordance with the information processing method of an embodiment of the present disclosure. The data used for performing the process in accordance with the information processing method of an embodiment of the present disclosure includes, for example, data that can be used to improve the accuracy of estimating the user's line-of-sight position.

The sensor according to an embodiment of the present disclosure includes, for example, any sensor capable of obtaining data that can be used for performing the process in accordance with the information processing method of an embodiment of the present disclosure, such as infrared sensors.

The information processing apparatus 100 may be configured without the operation input device 160 when the information processing apparatus has the configuration that performs the process based on the user's operation on the operation device that is an external device according to an embodiment of the present disclosure.

The information processing apparatus 100 may be configured without the imaging device 164, when data indicating the user's line-of-sight position is obtained from an external device and the process of the above (1) (line-of-sight position acquisition process) is performed on the data, or when data that can be used in specifying the user's line-of-sight position such as an image captured by an external imaging device is obtained from an external device and the process of the above (1) (line-of-sight position acquisition process) is performed on the data.

When the information processing apparatus 100 is configured to perform the process as a stand-alone device, the information processing apparatus 100 may be configured without the communication interface 166. The information processing apparatus 100 may be configured without the recording medium 156 or the display device 162.

Referring back to FIG. 8, an exemplary configuration of the information processing apparatus 100 is described. The imaging unit 102 is an imaging means provided in the information processing apparatus 100. The imaging unit 102 captures an image and generates a captured image. An image captured by the imaging unit 102 may be used as data that can be used in specifying the user's line-of-sight position in the process of the above (1) (line-of-sight position acquisition process). The control unit 106 controls, for example, an image capturing process in the imaging unit 102.

The imaging unit 102 is configured to include, for example, a lens/image sensor and a signal processing circuit.

The operation unit 104 is an operating means provided in the information processing apparatus 100. The operation unit 104 can be operated by the user and outputs an operation signal that contains a detection value in response to the user's operation. The operation unit 104 includes, for example, operation devices according to an embodiment of the present disclosure, such as the operation device described in the above (a), the operation device described in the above (b), and the rotary-type selector described in the above (c).

The control unit 106 is configured to include, for example, an MPU, and serves to control the overall operation of the information processing apparatus 100. The control unit 106 is configured to include the line-of-sight position acquisition unit 110, the state determination unit 112, and the processing unit 114. The control unit 106 serves, for example, as a main component to perform the process in accordance with the information processing method according to an embodiment of the present disclosure.

The line-of-sight position acquisition unit 110 serves as a main component to perform the process of the above (1) (line-of-sight position acquisition process) and acquires a user's line-of-sight position.

The state determination unit 112 serves as a main component to perform the process of the above (2) (state control process), and performs a transition to the active state in response to the selection start operation (first operation) by the user. More specifically, the state determination unit 112 performs the state control process of the first example described in the above (2-1), the state control process of the second example described in the above (2-2), and the state control process of the third example described in the above (2-3).

The processing unit 114 serves as a main component to perform the process of the above (3) (execution process). For example, the processing unit 114 determines an object corresponding to the line-of-sight position acquired by the line-of-sight position acquisition unit 110 in response to the user's selection determination operation (second operation) as a selected object. More specifically, for example, the processing unit 114 performs the execution process of the first example described in the above (3-1), the execution process of the second example described in the above (3-2), the execution process of the third example described in the above (3-3), and the execution process of the other example described in the above (3-4).

The information processing apparatus 100 having, for example, the configuration shown in FIG. 8 allows the process in accordance with the information processing method according to an embodiment of the present disclosure (for example, the process of the above (1) (line-of-sight position acquisition process), the process of the above (2) (state control process), and the process of the above (3) (execution process)) to be performed.

Thus, the information processing apparatus 100 having, for example, the configuration shown in FIG. 8 achieves an improvement in the usability.

With the configuration shown in FIG. 8, for example, the information processing apparatus 100 can achieve effects that can be achieved by, for example, the above process in accordance with the information processing method according to an embodiment of the present disclosure being performed.

The configuration of the information processing apparatus according to an embodiment of the present disclosure is not limited to that shown in FIG. 8.

For example, the information processing apparatus according to an embodiment of the present disclosure may be configured to include at least one of the line-of-sight position acquisition unit 110, the state determination unit 112, and the processing unit 114 as a component (for example, a separate processing circuit) that is separated from the control unit 106.

For example, the information processing apparatus according to an embodiment of the present disclosure may be configured without the imaging unit 102, when data indicating the user's line-of-sight position is obtained from an external device and the process of the above (1) (line-of-sight position acquisition process) is performed on the data, or when data that can be used in specifying the user's line-of-sight position such as an image captured by an external imaging device is obtained from an external device and the process of the above (1) (line-of-sight position acquisition process) is performed on the data.

The information processing apparatus 100 may be configured without the operation unit 104 when the information processing apparatus has the configuration performing the processing based on the user's operation on the operation device that is an external device according to an embodiment of the present disclosure.

The information processing apparatus according to an embodiment of the present disclosure may be configured without a communication unit (not shown) that communicates with external devices or equipment such as an external imaging device or external display device through a wired or wireless connection. Even when the communication unit (not shown) is not provided, the information processing apparatus according to an embodiment of the present disclosure can communicate with external devices or equipment through an external communication device.

The information processing apparatus according to an embodiment of the present disclosure may be configured to further include a detection unit (not shown) that is composed of any sensor capable of obtaining data that can be used in performing the process in accordance with the information processing method according to an embodiment of the present disclosure. When the information processing apparatus according to an embodiment of the present disclosure is configured to include a detection unit (not shown), the information processing apparatus allows a detection value obtained by the detection unit (not shown) to be used in performing the process in accordance with the information processing method according to an embodiment of the present disclosure.

In the above, the description has been given by taking the information processing apparatus as an embodiment of the present disclosure, but an embodiment of the present disclosure is not limited to such examples. An embodiment of the present disclosure may be applicable to various equipment, such as "imaging device including digital still cameras, digital video cameras, and smartphones with an imaging function", "glasses-type devices (eyewear)", "vehicle including automobile and train", "game consoles", "transparent or shielding HMD", "tablet-type device", "television set", "computer including personal computers (PCs)". An embodiment of the present disclosure may be applicable to integrated circuits (ICs) for processing that can be incorporated into the equipment described above.

Examples shown in FIG. 10 are exemplified as the operation device according to an embodiment of the present disclosure, the imaging device for the line-of-sight position acquisition process, and a target to be selected and operated by the user (example of processing associated with an object determined as a selected object). FIG. 10 is an explanatory diagram illustrating examples of the operation device according to an embodiment of the present disclosure, the imaging device for the line-of-sight position acquisition process, and a target to be selected and operated by the user. Examples of the operation device according to an embodiment of the present disclosure, the imaging device for the line-of-sight position acquisition process, and a target to be selected and operated by the user are not limited to the examples shown in FIG. 10.

The embodiment of the present disclosure may be implemented by a system including a plurality of apparatus based on the connection to a network (or communication between apparatus) like, for example, cloud computing. That is, the information processing apparatus according to an embodiment of the present disclosure may be implemented as, for example, an information processing system including a plurality of apparatus.

(Program According to Embodiment of Present Disclosure)

Program for causing a computer to function as the information processing apparatus according to an embodiment of the present disclosure (program capable of executing the process in accordance with the information processing method of an embodiment of the present disclosure, such as the process of the above (1) (line-of-sight position acquisition process), the process of the above (2) (state control process), and the process of the above (3) (execution process)) is executed by a processor in the computer, and resulting in an improvement in the usability.

Also, effects achieved by the above process in accordance with the information processing method according to an embodiment of the present disclosure can be achieved by a program causing a computer to function as an information processing apparatus according to an embodiment of the present disclosure being performed by a processor or the like in the computer.

It should be understood by those skilled in the art that various modifications, combinations, sub-combinations and alterations may occur depending on design requirements and other factors insofar as they are within the scope of the appended claims or the equivalents thereof.

For example, the above shows that a program (compute program) causing a computer to function as an information processing apparatus according to an embodiment of the present disclosure is provided, but an embodiment of the present disclosure can further provide a recording medium caused to store the program.

The above configuration shows an example of an embodiment of the present disclosure and naturally comes under the technical scope of the present disclosure.

Effects described in this specification are only descriptive or illustrative and are not restrictive. That is, the technology according to the present disclosure can achieve other effects obvious to a person skilled in the art from the description of this specification, together with the above effects or instead of the above effects.

Additionally, the present technology may also be configured as below.

(1) An information processing apparatus including:
   a line-of-sight position acquisition unit configured to acquire a line-of-sight position of a user;
   a state control unit configured to perform a transition to an active state in response to a first operation performed by the user, the active state being capable of selecting an object by the user through a line of sight of the user; and
   a processing unit configured to determine an object corresponding to the acquired line-of-sight position as a selected object in response to a second operation performed by the user subsequent to the first operation.

(2) The information processing apparatus according to (1),
   wherein the first operation is performed by a user and includes an operation for allowing an operation device to perform a transition from a state of not being operated to a state of being operated, the operation device being configured to obtain a binary detection value corresponding to the state of being operated and the state of not being operated, and
   wherein the state control unit, in an inactive state incapable of selecting an object by the user through a line of sight of the user, performs a transition to the active state upon detection of a detection value based on the first operation.

(3) The information processing apparatus according to (2),
   wherein the first operation allows the operation device to perform a transition from the state of not being operated to the state of being operated,
   wherein the second operation is performed by the user and allows the operation device in the state of being operated to perform a transition to the state of not being operated,
   wherein the state control unit performs a transition to the active state upon detection of a first detection value of the operation device corresponding to the state of being operated, and
   wherein the processing unit determines an object corresponding to the line-of-sight position as a selected object upon detection of a second detection value of the operation device corresponding to the state of not being operated after the active state is set.

(4) The information processing apparatus according to (2),
   wherein the first operation and the second operation allow the operation device to perform a transition from the state of not being operated to the state of being operated and then perform a transition from the state of being operated to the state of not being operated,
   wherein the state control unit performs a transition to the active state upon detection of a combination of a first detection value of the operation device corresponding to the state of being operated and a second detection value of the operation device corresponding to the state of not being operated, and
   wherein the processing unit determines an object corresponding to the line-of-sight position as a selected object upon detection of the combination of the first detection value and the second detection value after the active state is set.

(5) The information processing apparatus according to (1),
   wherein the first operation is a selection start operation performed on an operation device from which an at least ternary detection value is obtained, the at least ternary detection value being defined as respectively corresponding to a state of not being operated, a state of being subjected to the selection start operation of an object, and a state of being subjected to a selection determination operation of an object, and
   wherein the state control unit, in an inactive state incapable of selecting an object by the user through a line of sight of the user, performs a transition to the active state upon detection of a third detection value of the operation device corresponding to the state of being subjected to the selection start operation.

(6) The information processing apparatus according to (5),
   wherein the second operation is the selection determination operation performed on the operation device, and
   wherein the processing unit determines an object corresponding to the line-of-sight position as a selected object upon detection of a fourth detection value of the operation device corresponding to the state of being subjected to the selection determination operation after the active state is set.

(7) The information processing apparatus according to (5) or (6),
   wherein the state control unit performs a transition from the active state to the inactive state upon detection of a second detection value of the operation device corresponding to the state of not being operated after the active state is set.

(8) The information processing apparatus according to any one of (1) to (7),
   wherein the processing unit adjusts a parameter relating to the determined object based on a third operation performed by the user subsequent to the second operation, the third operation being used to adjust a parameter corresponding to the selected object.

(9) The information processing apparatus according to (8),
   wherein the third operation is performed on an operation device in which the first operation and the second operation are performed, and
   wherein the processing unit adjusts the parameter based on a fifth detection value of the operation device corresponding to the third operation.

(10) The information processing apparatus according to (9),
   wherein the operation device is a rotary-type selector including a mechanism for obtaining a binary detection value or a mechanism for obtaining an at least ternary detection value and a mechanism for obtaining a detection value in response to a rotary operation,
   wherein the first operation and the second operation are operations performed by the user on the mechanism for obtaining a binary detection value or the mechanism for obtaining an at least ternary detection value of the rotary-type selector, and
   wherein the third operation is a rotary operation on the mechanism for obtaining a detection value in response to the rotary operation of the rotary-type selector.

(11) The information processing apparatus according to any one of (1) to (10),
wherein the line-of-sight position acquisition unit acquires the line-of-sight position of the user in the active state.
(12) The information processing apparatus according to any one of (1) to (11),
wherein the state control unit prevents an object from being displayed on a display screen in an inactive state incapable of selecting the object by the user through the line of sight of the user, and performs a transition to the active state by allowing the object to be displayed on the display screen.
(13) The information processing apparatus according to (12),
wherein the state control unit, in the inactive state, allows a guidance object to be displayed at a position of the display screen on which the object is displayed in the active state, the guidance object indicating that the object is likely to be displayed.
(14) The information processing apparatus according to any one of (1) to (13),
wherein the processing unit prevents the selected object from being determined when there is no object corresponding to the acquired line-of-sight position, and
wherein, when the selected object is prevented from being determined, the state control unit performs is a transition from the active state to an inactive state incapable of selecting an object by the user through the line of sight of the user.
(15) The information processing apparatus according to any one of (1) to (14),
wherein the state control unit performs a transition from an active state to an inactive state when an object determined as the selected object is an object associated with a process for terminating a process relating to selection of an object, the inactive state being incapable of selecting an object by the user through the line of sight of the user.
(16) An information processing method for causing an information processing apparatus to execute:
acquiring a line-of-sight position of a user;
performing a transition to an active state in response to a first operation performed by the user, the active state being capable of selecting an object by the user through a line of sight of the user; and
determining an object corresponding to the acquired line-of-sight position as a selected object in response to a second operation performed by a user subsequent to the first operation.

What is claimed is:

1. An information processing apparatus comprising:
a line-of-sight position acquisition unit configured to acquire a line-of-sight position of a user;
a state control unit configured to
perform a transition from an inactive state to an active state in response to a first operation performed by the user, the active state being capable of selecting an object by the user through a line of sight of the user, and the inactive state characterized in that the object is not displayed on a display screen, and
control, in the inactive state, a display of a guidance object at an absolute position on the display screen where the object would be displayed in the active state; and
a processing unit configured to determine an object corresponding to the acquired line-of-sight position as a selected object in response to a second operation performed by the user subsequent to the first operation,
wherein the line-of-sight position acquisition unit, the state control unit, and the processing unit are each implemented via at least one processor.

2. The information processing apparatus according to claim 1,
wherein the first operation is performed by a user and includes an operation for allowing an operation device to perform a transition from a state of not being operated to a state of being operated, the operation device being configured to obtain a binary detection value corresponding to the state of being operated and the state of not being operated, and
wherein the state control unit, in an inactive state incapable of selecting an object by the user through a line of sight of the user, performs a transition to the active state upon detection of a detection value based on the first operation.

3. The information processing apparatus according to claim 2,
wherein the first operation allows the operation device to perform a transition from the state of not being operated to the state of being operated,
wherein the second operation is performed by the user and allows the operation device in the state of being operated to perform a transition to the state of not being operated,
wherein the state control unit performs a transition to the active state upon detection of a first detection value of the operation device corresponding to the state of being operated, and
wherein the processing unit determines an object corresponding to the line-of-sight position as a selected object upon detection of a second detection value of the operation device corresponding to the state of not being operated after the active state is set.

4. The information processing apparatus according to claim 2,
wherein the first operation and the second operation allow the operation device to perform a transition from the state of not being operated to the state of being operated and then perform a transition from the state of being operated to the state of not being operated,
wherein the state control unit performs a transition to the active state upon detection of a combination of a first detection value of the operation device corresponding to the state of being operated and a second detection value of the operation device corresponding to the state of not being operated, and
wherein the processing unit determines an object corresponding to the line-of-sight position as a selected object upon detection of the combination of the first detection value and the second detection value after the active state is set.

5. The information processing apparatus according to claim 1,
wherein the first operation is a selection start operation performed on an operation device from which an at least ternary detection value is obtained, the at least ternary detection value being defined as respectively corresponding to a state of not being operated, a state of being subjected to the selection start operation of an object, and a state of being subjected to a selection determination operation of an object, and
wherein the state control unit, in an inactive state incapable of selecting an object by the user through a line of sight of the user, performs a transition to the active state upon detection of a third detection value of the operation device corresponding to the state of being subjected to the selection start operation.

6. The information processing apparatus according to claim 5,
wherein the second operation is the selection determination operation performed on the operation device, and
wherein the processing unit determines an object corresponding to the line-of-sight position as a selected object upon detection of a fourth detection value of the operation device corresponding to the state of being subjected to the selection determination operation after the active state is set.

7. The information processing apparatus according to claim 5,
wherein the state control unit performs a transition from the active state to the inactive state upon detection of a second detection value of the operation device corresponding to the state of not being operated after the active state is set.

8. The information processing apparatus according to claim 1,
wherein the processing unit adjusts a parameter relating to the determined object based on a third operation performed by the user subsequent to the second operation, the third operation being used to adjust a parameter corresponding to the selected object.

9. The information processing apparatus according to claim 8,
wherein the third operation is performed on an operation device in which the first operation and the second operation are performed, and
wherein the processing unit adjusts the parameter based on a fifth detection value of the operation device corresponding to the third operation.

10. The information processing apparatus according to claim 9,
wherein the operation device is a rotary-type selector including a mechanism for obtaining a binary detection value or a mechanism for obtaining an at least ternary detection value and a mechanism for obtaining a detection value in response to a rotary operation,
wherein the first operation and the second operation are operations performed by the user on the mechanism for obtaining a binary detection value or the mechanism for obtaining an at least ternary detection value of the rotary-type selector, and
wherein the third operation is a rotary operation on the mechanism for obtaining a detection value in response to the rotary operation of the rotary-type selector.

11. The information processing apparatus according to claim 8, wherein the processing unit adjusts the parameter by adjusting an operation function of the information processing apparatus.

12. The information processing apparatus according to claim 1,
wherein the line-of-sight position acquisition unit acquires the line-of-sight position of the user in the active state.

13. The information processing apparatus according to claim 1,
wherein the state control unit performs a transition to the active state by allowing the object to be displayed on the display screen.

14. The information processing apparatus according to claim 1,
wherein the processing unit prevents the selected object from being determined when there is no object corresponding to the acquired line-of-sight position, and
wherein, when the selected object is prevented from being determined, the state control unit performs a transition from the active state to an inactive state incapable of selecting an object by the user through the line of sight of the user.

15. The information processing apparatus according to claim 1,
wherein the state control unit performs a transition from an active state to an inactive state when an object determined as the selected object is an object associated with a process for terminating a process relating to selection of an object, the inactive state being incapable of selecting an object by the user through the line of sight of the user.

16. The information processing apparatus according to claim 1, wherein the state control unit is further configured to control a display of an auxiliary object on the display screen indicating the line of sight of the user.

17. The information processing apparatus according to claim 1, wherein the processing unit is further configured to control a display of information relating to the determined object subsequent to the second operation.

18. An information processing method, the method being executed via at least one processor, and comprising:
acquiring a line-of-sight position of a user;
performing a transition from an inactive state to an active state in response to a first operation performed by the user, the active state being capable of selecting an object by the user through a line of sight of the user, and the inactive state characterized in that the object is not displayed on a display screen;
controlling, in the inactive state, a display of a guidance object at an absolute position on the display screen where the object would be displayed in the active state; and
determining an object corresponding to the acquired line-of-sight position as a selected object in response to a second operation performed by a user subsequent to the first operation.

19. A non-transitory computer-readable medium having embodied thereon a program, which when executed by a computer causes the computer to execute a method, the method comprising:
acquiring a line-of-sight position of a user;
performing a transition from an inactive state to an active state in response to a first operation performed by the user, the active state being capable of selecting an object by the user through a line of sight of the user, and the inactive state characterized in that the object is not displayed on a display screen;
controlling, in the inactive state, a display of a guidance object at an absolute position on the display screen where the object would be displayed in the active state; and
determining an object corresponding to the acquired line-of-sight position as a selected object in response to a second operation performed by a user subsequent to the first operation.

* * * * *